(12) United States Patent
Schlicher et al.

(10) Patent No.: US 12,737,715 B2
(45) Date of Patent: Sep. 15, 2026

(54) METHOD, SYSTEM AND COMPUTER PROGRAM PRODUCT FOR DISTRIBUTED STATE ENGINE RULE PROCESSING SYSTEM

(71) Applicant: AVC Innovations LLC, Spearfish, SD (US)

(72) Inventors: Bob G. Schlicher, Knoxville, TN (US); David J. Todd, Spearfish, SD (US); Niels C. Skjoldager, Seminole, FL (US); Shaikha Dheya Ebrahim Al Khalifa, Manama (BH)

(73) Assignee: AVC Innovations, LLC., Spearfish, SD (US)

( * ) Notice: Subject to any disclaimer, the term of this patent is extended or adjusted under 35 U.S.C. 154(b) by 0 days.

(21) Appl. No.: 18/600,606

(22) Filed: Mar. 8, 2024

(65) Prior Publication Data

US 2025/0021924 A1 Jan. 16, 2025

Related U.S. Application Data

(60) Provisional application No. 63/526,922, filed on Jul. 14, 2023.

(51) Int. Cl.
*G06Q 10/0832* (2023.01)
*H04L 9/00* (2022.01)

(52) U.S. Cl.
CPC ........... *G06Q 10/0832* (2013.01); *H04L 9/50* (2022.05)

(58) Field of Classification Search
CPC .............................. G06Q 10/0832; H04L 9/50
See application file for complete search history.

(56) References Cited

U.S. PATENT DOCUMENTS 7,716,619 B2 5/2010 Braceras et al.
9,855,785 B1 1/2018 Nagelberg et al.
(Continued)

OTHER PUBLICATIONS

ISR & WO from PCT/US 24/ 19448 with four references.

*Primary Examiner* — George Chen
*Assistant Examiner* — Duane N. Moore
(74) *Attorney, Agent, or Firm* — Reston Law Group, LLP; Ralph P. Albrecht; Jesse A. Fenty

(57) ABSTRACT

A method of using a FiniteStateMachine (FSM) for processing data/events for CustomsCargoShipments, using distributed SWAppNodeServices (ANS) where each AppNode is an FSM state, and each ANS is deployed as independent operating service BusinessRules for assigned state. RulesEngine (RE) executes rules, combines incoming event data with existing shipment data (SmartPass), obtained from ShipmentRecordDatabase. When transaction event arrives, SmartPassState (SPS) determined, event routed to ANS process specifically for SPS. At ANS, event data combined with SmartPassData and RuleSet processed through RE. After completed, RE results, data values (DV) and action identifiers (AI), become TransactionRequest (TR) for action, routed to MatchedActionService (MAS), authenticated, executed based on data details. After TR sent, ANS executes AfterStateProcessor (ASP) determining state transition, updates/saves to SmartPass and (logging, posting activity transaction to blockchain, notifications, determining fulfillment criteria for current state, or receiving instructions for processing current state, as required). After processing, ANS stateless, clears out data for SmartPass & event processed.

23 Claims, 7 Drawing Sheets

(56) References Cited

U.S. PATENT DOCUMENTS

| | | | |
|---|---|---|---|
| 10,505,726 | B1 | 12/2019 | Andon et al. |
| 10,540,654 | B1 | 1/2020 | James et al. |
| 10,614,661 | B2 | 4/2020 | Doney et al. |
| 10,789,239 | B2 | 9/2020 | Ventura et al. |
| 10,951,409 | B2 | 3/2021 | Konda et al. |
| 10,972,274 | B2 | 4/2021 | Redpath et al. |
| 10,991,185 | B1 | 4/2021 | Luthra et al. |
| 11,038,718 | B2 | 6/2021 | Simons |
| 11,048,788 | B2 | 6/2021 | Witchey et al. |
| 11,070,564 | B2 | 7/2021 | McIver et al. |
| 11,138,580 | B1 | 10/2021 | Koch |
| 11,170,092 | B1 | 11/2021 | Liang |
| 11,171,782 | B2 | 11/2021 | Tang et al. |
| 11,200,569 | B1 | 12/2021 | James et al. |
| 2004/0221162 | A1 | 11/2004 | Kongtcheu |
| 2009/0077386 | A1 | 3/2009 | Simonian |
| 2016/0283920 | A1 | 9/2016 | Fisher et al. |
| 2017/0046664 | A1 | 2/2017 | Haldenby et al. |
| 2019/0080319 | A1* | 3/2019 | Carey .................... G06Q 20/36 |
| 2019/0130416 | A1 | 5/2019 | Boudville et al. |
| 2019/0279197 | A1 | 9/2019 | Wright et al. |
| 2020/0280444 | A1 | 9/2020 | Tang et al. |
| 2020/0294128 | A1 | 9/2020 | Cella |
| 2022/0058633 | A1* | 2/2022 | Yantis .................. G06F 21/602 |
| 2022/0253868 | A1 | 8/2022 | Scarseli |

* cited by examiner

900

METHOD, SYSTEM AND COMPUTER PROGRAM PRODUCT FOR DISTRIBUTED STATE ENGINE RULE PROCESSING SYSTEM

BACKGROUND OF THE DISCLOSURE

Field of the Disclosure

The disclosure relates generally to supply chain, and more particularly to supply chain management systems.

SUMMARY OF THE INVENTION

According to an example embodiment, a system, method and/or computer program product may be set forth including an example computer implemented method of using a finite state machine (FSM) for processing of data and events for shipments of various cargo at a port through customs, in a distributed, application (app) computing environment comprising at least one electronic computer processor coupled to at least one electronic memory storage device and coupled via at least one communications network interface to at least one data communications network, the method comprising: electronically processing, by the at least one electronic computer processor, a collection of at least one distributed software app node service of the FSM where each of said at least one app node service comprises a single state of the state machine, by the at least one electronic computer processor, wherein each of said at least one app node services comprises implementation and deployment as an independent operating service comprising at least one business rule for said each of said at least one app node services; electronically executing, by the at least one electronic computer processor, said at least one business rule, by at least one rules engine; electronically obtaining, by the at least one electronic computer processor, shipment data (SmartPass) from at least one shipment record database; electronically combining, by the at least one electronic computer processor, incoming event data with existing shipment data (SmartPass); electronically processing, by the at least one electronic computer processor, said at least one business rule, by the at least one rules engine; electronically receiving, by the at least one electronic computer processor, at least one transaction event, and electronically determining upon receipt of said at least one transaction event, at least one SmartPass state and electronically routing said at least one transaction event to an appropriate of said at least one app node services for processing said at least one SmartPass state; electronically processing, by the at least one electronic computer processor, at said appropriate of said at least one app node services, electronically combining event data with the existing shipment data (SmartPass) and an associated rule set of said at least one business rules, and electronically processing, by the at least one electronic computer processor, by said at least one rules engine said associated rule set on the existing shipment data (SmartPass); electronically combining, by the at least one electronic computer processor, at least one value and at least one action identifier into at least one transaction action request, after completion of said electronically processing of the appropriate rules set, by said at least one rules engine data; electronically routing, by the at least one electronic computer processor, said at least one transaction action request to a matched action service of said at least one app node services, and upon electronically authenticating said at least one transaction action request, electronically executing, by the at least one electronic computer processor, said at least one transaction action request, based on data details included in said at least one transaction action request; electronically executing, by the at least one electronic computer processor, an after state processor, after said electronically routing has been routed, and electronically determining, by the at least one electronic computer processor, state transition comprising performing as required at least one or more of: performing, by the at least one electronic computer processor, update saves to the existing shipment data (in the SmartPass); logging, by the at least one electronic computer processor, an activity transaction to at least one blockchain; posting, by the at least one electronic computer processor, an activity transaction to the at least one blockchain; transmitting, by the at least one electronic computer processor, at least one notification message; determining at least one fulfillment criteria for current state; or receiving instructions to override processing instructions for current state;

and electronically placing, by the at least one electronic computer processor, said matched action service of said at least one app node services stateless, after said electronically executing of said at least one transaction action request is complete, and electronically clearing out, by the at least one electronic computer processor, any data processed for said existing shipment data (in the SMARTPASS) and said at least one transaction event received.

According to another example embodiment, a system of using a finite state machine (FSM) for processing of data and events for shipments of various cargo at a port through customs, in a distributed, application (app) computing environment, the system may include: at least one electronic computer processor, coupled to at least one electronic memory storage device and coupled via at least one communications network interface, coupled to at least one data communications network, the system comprising wherein said at least one electronic computer processor is configured to: electronically process a collection of at least one distributed software app node service of the FSM where each of said at least one app node service comprises a single state of the state machine wherein each of said at least one app node services comprises implementation and deployment as an independent operating service comprising at least one business rule for said each of said at least one app node services; electronically execute said at least one business rule, by at least one rules engine; electronically obtain shipment data ((in the SMARTPASS) from at least one shipment record database; electronically combine incoming event data with existing shipment data ((in the SMARTPASS); electronically process said at least one business rule, by the at least one rules engine; electronically receive at least one transaction event, and electronically determine upon receipt of said at least one transaction event, at least one SmartPass state and electronically routing said at least one transaction event to an appropriate of said at least one app node services for processing said at least one SmartPass state; electronically process at said appropriate of said at least one app node services, electronically combine event data with the existing shipment data (in the SMARTPASS) and an associated rule set of said at least one business rules, and electronically process by said at least one rules engine said associated rule set on the existing shipment data ((in the SMARTPASS); electronically combine at least one value and at least one action identifier into at least one transaction action request, after completion of said electronically processing of the appropriate rules set, by said at least one rules engine data; electronically route said at least one transaction action request to a matched action service of said at least one app node services, and upon electronically authenticating said at least one transaction action request, electronically execute said at least one transaction action request, based on data details included in said at least one transaction action request; electronically execute an after state machine, after said electronically route has been routed, and electronically determine at least one state transition comprising being configured to perform as required at least one or more of: perform update saves to the existing shipment data ((in the SMARTPASS); log an activity transaction to at least one blockchain; post an activity transaction to the at least one blockchain; transmit at least one notification message; determine at least one fulfillment criteria for current state; or receive instructions to override processing instructions for current state;

and electronically place said matched action service of said at least one app node services stateless, after said electronically execute of said at least one transaction action request is complete, and electronically clear out any data processed for said existing shipment data (SmartPass) and said at least one transaction event received.

According to yet another example embodiment, an example computer program product embodied on a computer accessible nontransitory storage medium, including at least one instruction, which when executed on at least one electronic computer processor performs a method of using a finite state machine (FSM) for processing of data and events for shipments of various cargo at a port through customs, in a distributed, application (app) computing environment comprising at least one electronic computer processor coupled to at least one electronic memory storage device and coupled via at least one communications network interface to at least one data communications network, the method may include: electronically processing a collection of at least one distributed software app node service of the FSM where each of said at least one app node service comprises a single state of the state machine, by the at least one electronic computer processor, wherein each of said at least one app node services comprises implementation and deployment as an independent operating service comprising at least one business rule for said each of said at least one app node services; electronically executing said at least one business rule, by at least one rules engine; electronically obtaining shipment data (SmartPass) from at least one shipment record database; electronically combining incoming event data with existing shipment data (SmartPass); electronically processing said at least one business rule, by the at least one rules engine; electronically receiving at least one transaction event, and electronically determining upon receipt of said at least one transaction event, at least one SmartPass state and electronically routing said at least one transaction event to an appropriate of said at least one app node services for processing said at least one SmartPass state; electronically processing at said appropriate of said at least one app node services, electronically combining event data with the existing shipment data (SmartPass) and an associated rule set of said at least one business rules, and electronically processing, by the at least one electronic computer processor, by said at least one rules engine said associated rule set on the existing shipment data (SmartPass); electronically combining at least one value and at least one action identifier into at least one transaction action request, after completion of said electronically processing of the appropriate rules set, by said at least one rules engine data; electronically routing said at least one transaction action request to a matched action service of said at least one app node services, and upon electronically authenticating said at least one transaction action request, electronically executing said at least one transaction action request, based on data details included in said at least one transaction action request; electronically executing an after state processor, after said electronically routing has been routed, and electronically determining at least one state transition comprising performing as required at least one or more of: performing update saves to the existing shipment data (SmartPass); logging an activity transaction to at least one blockchain; posting an activity transaction to the at least one blockchain; transmitting at least one notification message; determining at least one fulfillment criteria for current state; or receiving instructions to override processing instructions for current state;

and electronically placing said matched action service of said at least one app node services stateless, after said electronically executing of said at least one transaction action request is complete, and electronically clearing out any data processed for said existing shipment data (SmartPass) and said at least one transaction event received.

According to one example embodiment, embodiments of the claimed invention may relate to using a collection of software App Node Services that are deployed in a distributed computing environment where each App Node may correspond to a single state of a finite state machine (FSM) that may model a state-based application that can be applied to supply chain management at a shipment port, according to an example embodiment. The disclosed method may include, according to an example embodiment, an FSM for the life cycle of processing for shipment data and events of various cargos at a port through customs processing to its data processing completion, according to an example embodiment. The FSM, according to an example embodiment, may include being executed over a finite time duration, may be data event-driven, and may be operated over a collection of App Node Services at different times deployed in a distributed computing environment, according to an example embodiment.

The construction and method of operation of the invention and additional objects and advantages of the invention may be best understood from the following description of specific embodiments when read in connection with the accompanying drawings, according to an example embodiment.

BRIEF DESCRIPTION OF THE VARIOUS EXAMPLE VIEWS OF THE DRAWINGS

This present disclosure will be fully understood with reference to the following detailed description when taken in conjunction with the figures, herein:

Figure 9:
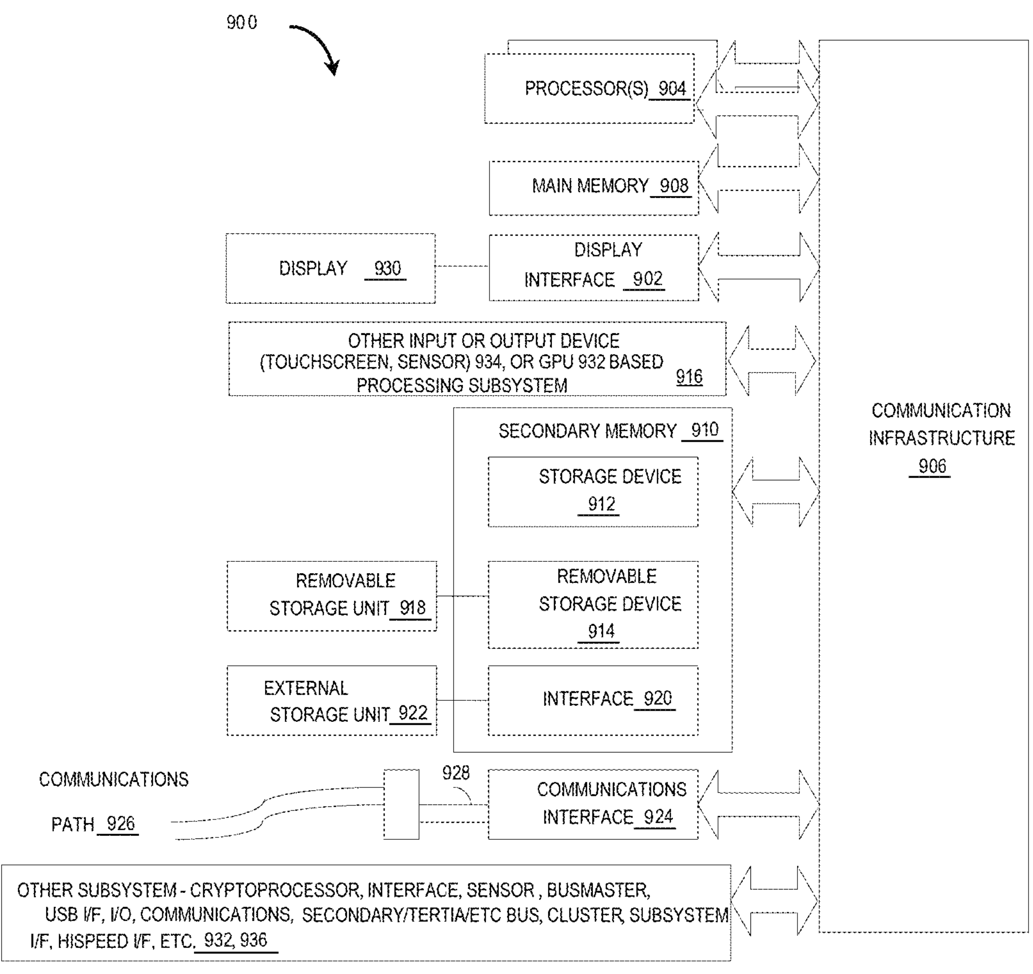
Figure 10:
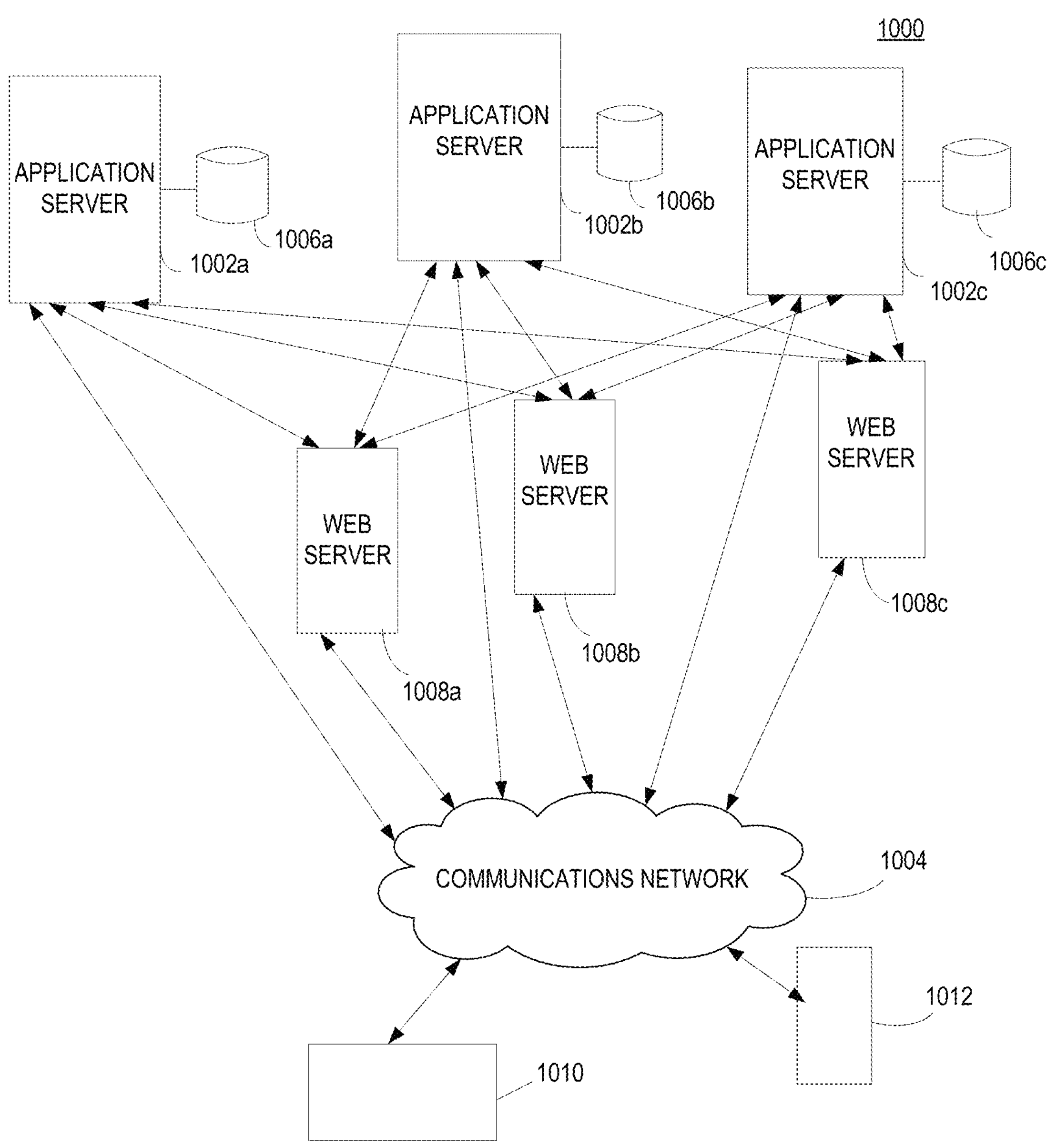

FIG. 9 depicts an example embodiment of an example component level example hardware architecture for an example computing device as may be used for any of various example hardware subsystem components of an example system, according to one example embodiment; and FIG. 10 depicts an example embodiment illustrating an example system level hardware architecture for an example application server, web server embodiment of an example service provider system for providing an example software architecture of various example subsystem components of an example networking system, which may be used to implement, according to one example embodiment.

DETAILED DESCRIPTION OF THE INVENTION

The various embodiments of the invention described herein should not be limited to the description, even with reference to the accompanying figures and drawings depicted, but only with respect to the claims. The invention may be embodied in different forms and should not be restricted as set forth here.

Overview of State Diagrams

For this disclosure as discussed further below with reference to FIG. 5, a method is described involving an example Finite State Machine (FSM) for data and events for the shipment of goods through customs processing for import, according to an example embodiment. This FSM includes these eight unique states as: Start 502, In_Transit 504, Ready for Customs 508, At Customs 510, Released 514, Rejected 512, On Hold 516, and Completed 518, according to an example embodiment.

Figure 1:
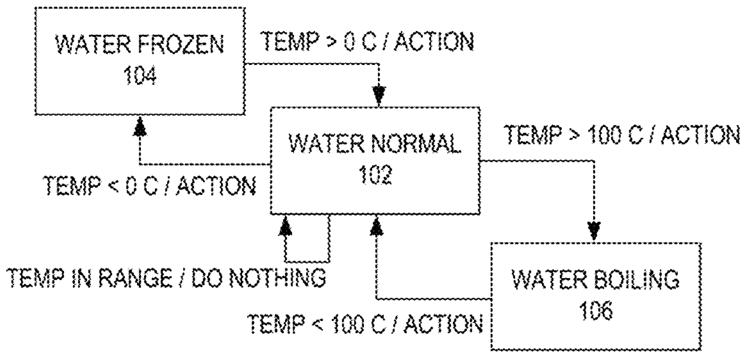
FIG. 1 depicts an example state diagram of an example system according to the prior art.

FIG. 1 depicts an example state diagram 100 of an example system according to the prior art.

Referring to FIG. 1, the visual notation called a State Machine Diagram or just State Machine illustrates a Finite State Machine (FSM), according to an example embodiment. The three terms will be used interchangeably to mean the same thing, according to an example embodiment. This notation is standardized by the Unified Modeling Language (UML) and is followed and modified as required for this disclosure, according to an example embodiment. In general, a State Machine is used to describe the behavior of a system, component, or a program object that responds differently to the same received event depending on its current state, according to an example embodiment. A simple example to explain this is to consider states of water as measured by a sensor, according to an example embodiment. At room temperature range, water is a liquid, according to an example embodiment. At freezing temperatures, water is frozen, according to an example embodiment. This simple example is illustrated in FIG. 1, according to an example embodiment. And at hot enough temperatures, water boils, according to an example embodiment. All three of these can be thought of as different states of water, where in each state, the interaction with water, for example, poking your finger at it or adding a block of butter, will yield a different response or behavior, according to an example embodiment. The change between these states, such as going from Water Normal 102 (liquid) to Water Frozen 104 (solid) or to Water Boiling 106 (gas) is called a transition, according to an example embodiment. The trigger for that transition is the change in temperature to freezing as illustrated on the arrow with the trigger as "temp<0/Action", according to an example embodiment. This trigger illustrates two parts: 1) the condition with the temperature, and 2) Action that is performed for the transition between the two states, according to an example embodiment. For this example, "Action" was used to simply identify the notation position and could be filled in with "alert to sensor manager", according to an example embodiment. The water sensor may receive events in which there are no transitions, according to an example embodiment. These are notated as loops that come of out the state and return to the same state, according to an example embodiment. For this example, this can happen when the sensor performs a measurement of the water on a periodic basis and the temperature is within range, according to an example embodiment. In this case, since no Action is required this is show as "do nothing", according to an example embodiment. These inaction loops are normally not illustrated but for this example discussion, it is shown on the Water Normal state, according to an example embodiment.

In general, a state may be a situation in the life cycle of a system that can have many different situations, according to an example embodiment. A system may change its state not only as a direct evaluation of the current input (temperature change) but may also be dependent on some past history of its inputs and the system, e.g., salt is dissolved in the water, according to an example embodiment. With reference to FIGS. 1, when a transition occurs, an Action, as shown on the arrows, is usually performed for the transition before arriving at the new state, according to an example embodiment. A State Machine describes all events, states, and transitions involved within the scope of the system, according to an example embodiment.

Figure 2:
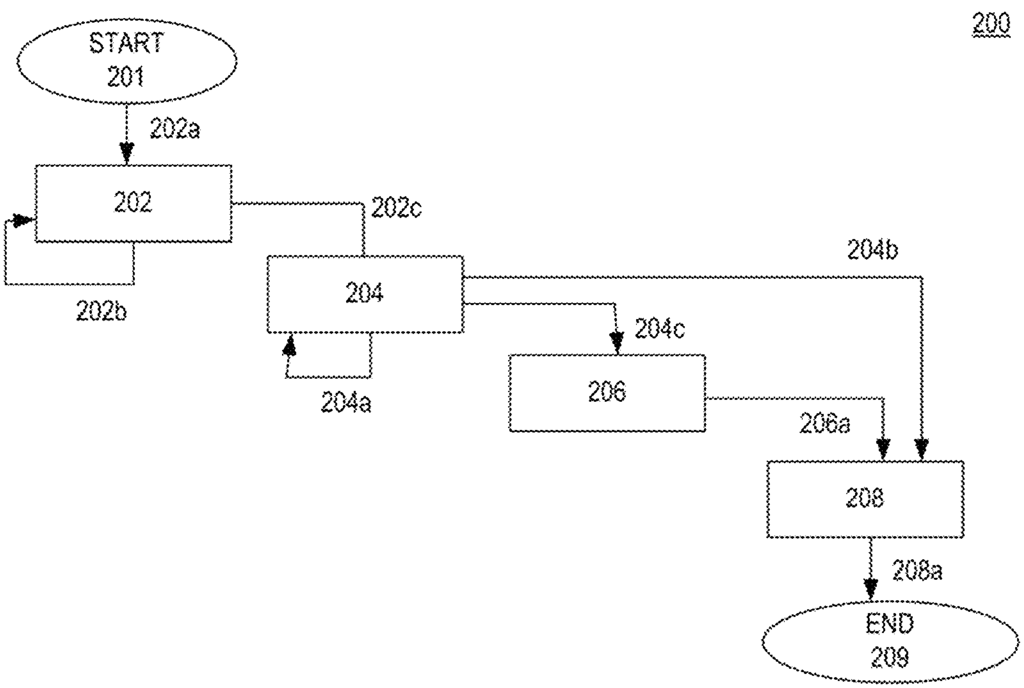
FIG. 2 is an example illustration of a high-level state diagram for example customs processing, according to an example embodiment.

FIG. 2 is an example illustration 200 of a high-level state diagram for example customs processing, according to an example embodiment.

Customs processing or customs clearance is the process of moving products and goods through customs evaluations and enforcements so the products and goods can enter the country, according to an example embodiment in FIG. 2. Countries typically have different import laws, requirements, regulations, relationships, and fees for different types of cargo, according to an example embodiment. In this disclosure, these are encoded as business rules, according to an example embodiment. Despite the different customs needs for each country, the clearance process can be generalized in five high-level description workflow steps as follows, according to an example embodiment.

FIG. 2 may begin with shipment in dock at port 202*a* and immediately may continue shipment arrived state 202.

1) Shipment Arrived 202; A shipment of goods arrives at the port for entry, and following review and paperwork confirmation 202*b* may eventually arrive at the buyer in the country, and once confirmed and paperwork sent 202*c*, the state may transition to state at customs 204, according to an example embodiment.
2) At Customs 204; A customs officer examines the required customs paperwork for the goods and verifies their completeness, including cargo, paperwork/assessing duties and taxes 204*a*, according to an example embodiment.
3) Duties and Taxes Calculated 204*a*; Based on the goods and paperwork, customs assesses import duties and taxes to impose, if payment is arranged or if no payment is required, then import is approved 204*b* allows for the transitioning to shipment cleared 208, or if payment is required, notify parties 204*c* and transition to the state pay taxes and fees 206, according to an example embodiment.

4) Taxes and Fees Paid 206; If required, customs requests payment for taxes and duties, according to an example embodiment. A third-party customs broker typically handles payment arrangements, according to an example embodiment. The broker arranges for the payment either from the buyer, seller, or a financing representative, depending on the trade arrangement, once payment is confirmed, and the import is approved 206*a* then the state transitions to the shipment cleared state 208, according to an example embodiment.

5) Shipment Cleared 208; Customs clears the goods after all duties are paid, and the cargo departs the port into the country, and paperwork is filed 208*a*, and the finite state machine 200 may immediately end, according to an example embodiment.

An FSM may be inferred from this description and illustrated in FIG. 2 that identifies the states as assigned to the shipment or cargo, according to an example embodiment. This serves as an analysis foundation for specifying the detailed FSM for this disclosure that differs in details and emphasizes the states for more efficiency with collecting and verifying the shipment data and documents based on different Customs Processing import requirements and laws, according to an example embodiment.

Figure 3:
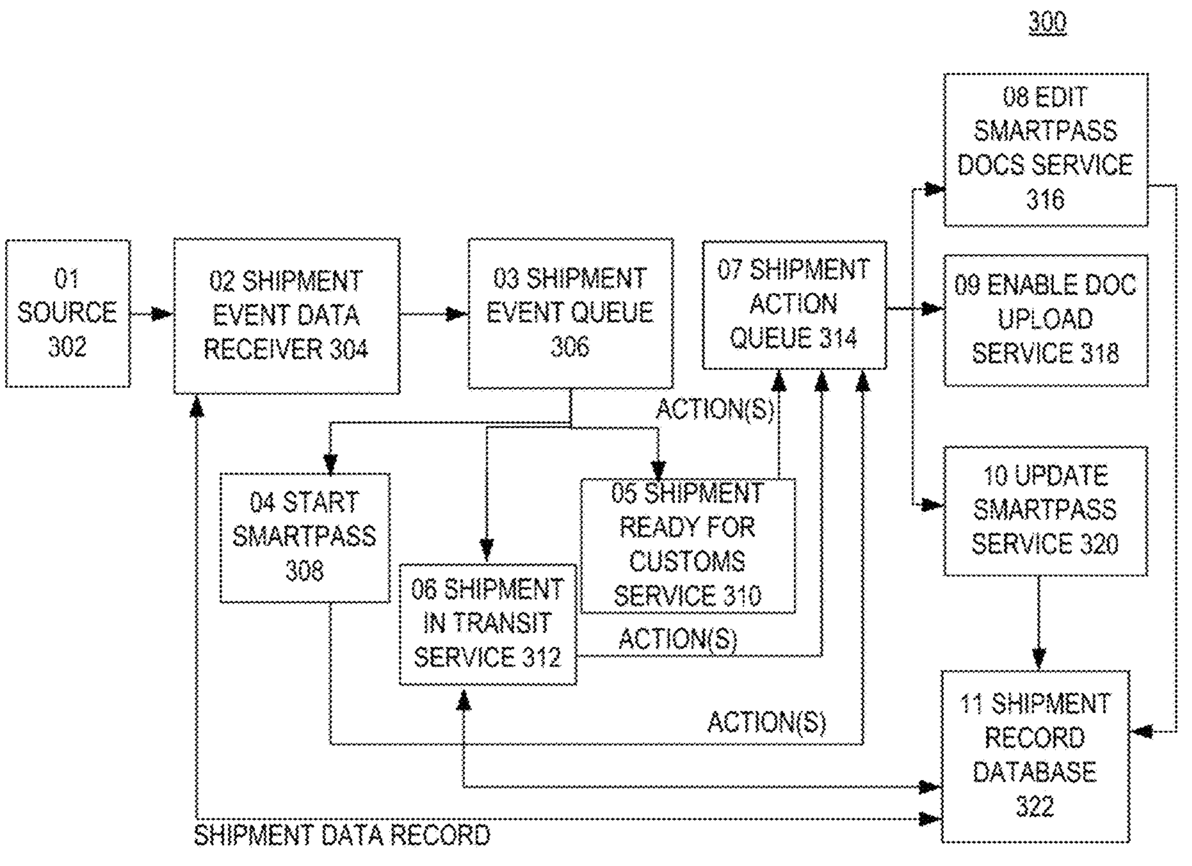
FIG. 3 is an example state diagram for a finite state machine for an example SmartPass App, according to an example embodiment.

FIG. 3 is an example state diagram for a finite state machine for an example SmartPass App, according to an example embodiment.

The disclosed method operates a flow through of a system of components, called the FSM Framework, as illustrated in the block diagram in FIG. 3 that is specific to SmartPass application data and processing, according to an example embodiment. The A subset of the FSM states and a subset of the Actions are illustrated in the diagram to keep it from becoming too visually cluttered and complex, according to an example embodiment. In FIG. 3, the App Node Services include 04 Start SmartPass 308, 05 Shipment Ready_for_customs 310, and 06 Shipment In_Transit 312, according to an example embodiment. Each of these corresponds to a state of the SmartPass FSM, according to an example embodiment.

When event data for a shipment is received at 02 Shipment Event Data Receiver 304 from 01 Source 302, the event data is matched with the corresponding shipment data record (SDR) or SmartPass from the 11 Shipment Record Database 322, according to an example embodiment. The disclosed method obtains the Record State or Shipment State data from the SmartPass, according to an example embodiment. With this Record State, the disclosed method routes the event data and SmartPass to a separate App Node Service (04/308, 05/310, or 06/312 for this diagram) that is dedicated to processing SmartPass data and events for only that Shipment State, according to an example embodiment. A deployment example for an App Node Service is an API-based microservice operating in a docker container operating on a different computing device that is reachable by a network connection in an AWS Virtual Private Cloud (VPC), according to an example embodiment. The disclosed method provides for separate App Node Services corresponding to each state of an FSM, according to an example embodiment. Each App Node Service operates independently and collectively forms the complete FSM for the data and events for the shipment of goods, according to an example embodiment. Each App Node Service in deployment is a stateless-service and can operate multiple, simultaneous event transactions that are independent of each other, according to an example embodiment.

To improve clarity, the term stateless-service has been introduced to separate it from the SmartPass or Application Record State that is part of the FSM, according to an example embodiment. In the practiced art for service deployments in information systems, a service is said to be stateful if after a transaction is executed on that service, the data for that transaction remains stored in that service, according to an example embodiment. When another transaction arrives at the same service and is determined to be related the stored data, the stored data is used for processing the transaction, according to an example embodiment. In the same practiced art, a service is said to be stateless, such as the App Node Service, if after a transaction is executed on that service, the data for that transaction is not stored in the service, according to an example embodiment. For this disclosure, the App Node Service is a stateless-service that contains the executable code for the behavior for one Record State, according to an example embodiment. Thus, the lifecycle of a system modeled as a FSM will have at least one stateless-service (App Node Service) operating for each individual Record State and its executable code, according to an example embodiment. Transactions that arrive to the system are routed to the App Node Service based on the state of the matching SmartPass Record for that transaction, according to an example embodiment. Since these are stateless, stateless-services can be replicated in numbers based on the volume of transactions, according to an example embodiment. Thus enabling auto-scaling with the number of replicated nodes to handle the processing for the volume of the transactions, according to an example embodiment. An increase in numbers accommodates the increase in the volume of transactions and also a decrease in numbers accommodates the decrease in volume, according to an example embodiment. Different Record State types of App Node Services may be scaled independent off each other, according to an example embodiment. For example, there may be a larger number of App Node Services for the In_Transit state compared with just a few for Ready_for_customs state, according to an example embodiment. This scaling does not impact the processing for the life cycle of the system, according to an example embodiment.

Figure 4:
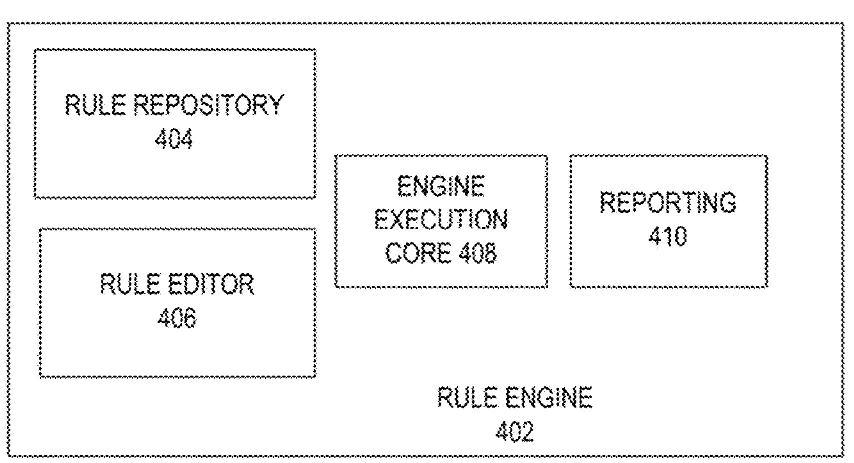
FIG. 4 is an example schematic diagram illustrating a rule engine and its components, according to an example embodiment.

FIG. 4 is an example schematic diagram 400 illustrating a rule engine and its components, according to an example embodiment.

The implementation for the executable code for the Record State assigned to an App Node Service can be based on rules that are executed by an embedded Rule Engine that can run inside of a blockchain smart contract, according to an example embodiment. An embedded Rule Engine is a software component in an application that allows its users to define, edit, or remove business logic for the application, according to an example embodiment. The business logic in this case is expressed as a set of rules that are separate from the core software code of the application, according to an example embodiment. For this disclosure, the Rule Engine is embedded in the smart contract and executed by the smart contract code, according to an example embodiment. A typical Rule Engine 402 may include four major parts and is illustrated in FIG. 4, according to an example embodiment.

1) Rule repository 404; database for storing the business rules, typically defined by a businessperson, according to an example embodiment.

2) Rule editor 406; user interface or file that allows for creating, modifying, and removing rules, according to an example embodiment.
3) Reporting 410; user interface for querying and auditing the business rules stored in the repository, according to an example embodiment.
4) Engine Execution Core 408; execution code that runs the business rules, according to an example embodiment.

The executable code may include for evaluating the condition of received transaction data combined with the Record Data, according to an example embodiment. For this method, the executable code, Rule Engine, and supporting components are referred to as "Asset State Engine", according to an example embodiment. The evaluation may result with changing the Record Data, identifying actions to be executed next, specifying a state transition, or a combination of all of these, according to an example embodiment. This Asset State Engine running in the App Node Service does not execute the Actions, according to an example embodiment. Rather, it assigns an Action Request to an Action Queue to execute the Action, according to an example embodiment. The Action Queue routes the Action requests to Action Services that perform the action, according to an example embodiment.

Figure 5:
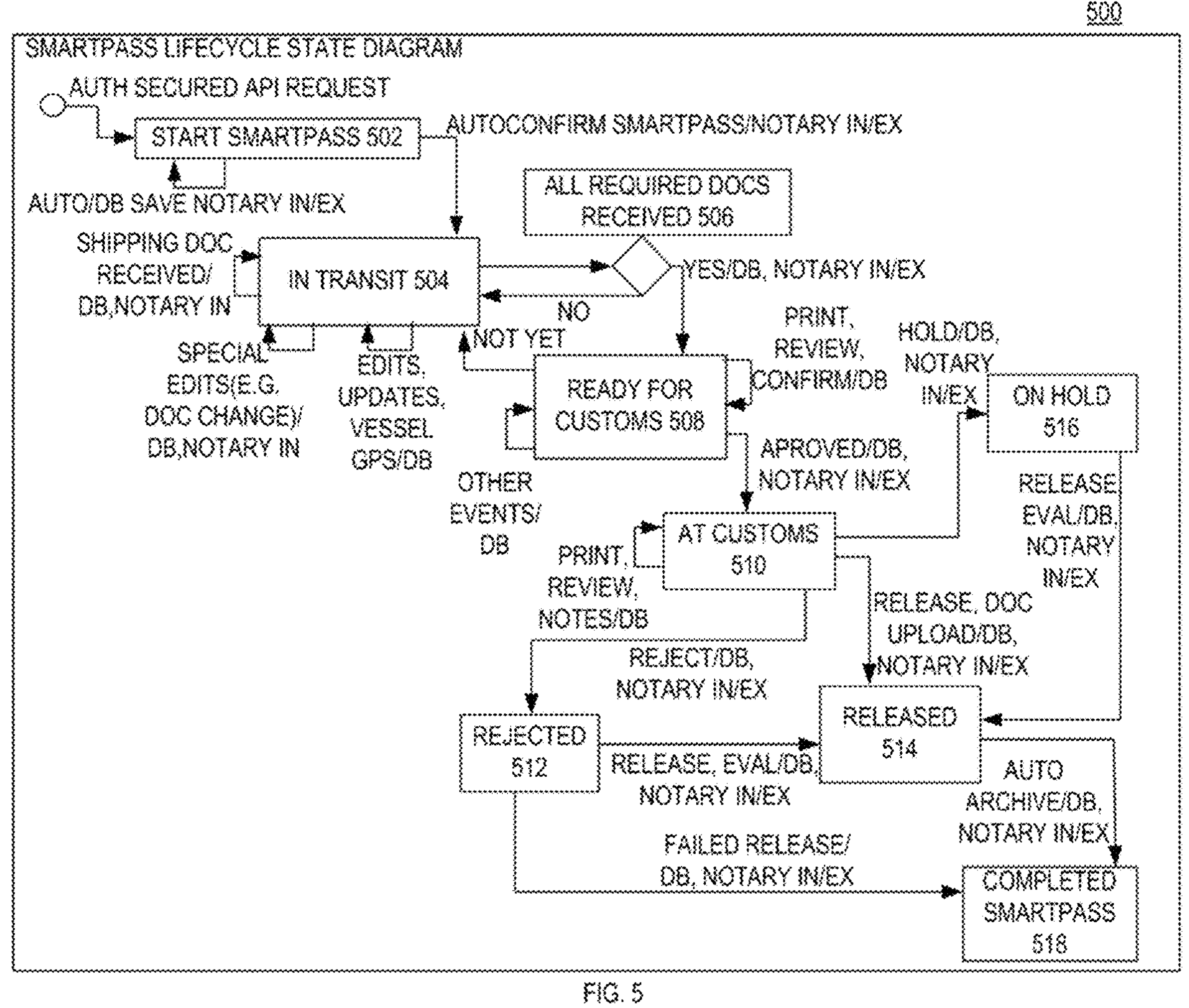
FIG. 5 is an example state diagram illustrating an example lifecycle of an asset such as an example SmartPass, according to an example embodiment.

FIG. 5 is an example state diagram 500 illustrating an example lifecycle of an asset such as an example SmartPass, according to an example embodiment.

The disclosed method for implementing the FSM can be applied to other state based applications similar to SmartPass described herein, according to an example embodiment. A sample of state-based applications includes ordering online, booking travel, presenting UI screen, and other similar use cases as summarized as follows, according to an example embodiment.

Ordering From Online E-Commerce Site: An item may undergo different states and follow a main logical state path that may include, e.g., but not limited to: Selected (to cart), Removed (from cart), Ordered, Packaged, Shipped, Tracked, Cancelled, Delayed, Delivered, Paid, Received, and Reviewed, according to an example embodiment. Transitions between these states can occur when the buyer, supplier, or logistics system provides events into the E-Commerce system, according to an example embodiment. Buyer actions can include selecting, removing, ordering, cancelling, paying, receiving, and reviewing, according to an example embodiment. Supplier actions can include packaging and shipping, according to an example embodiment. Logistics can include tracking, delaying, and delivering, according to an example embodiment.

Ordering Online food for Curbside pickup: ordering food online may undergo different states similar to ordering from an e-commerce site that may include states for an item:

Food Selected (to cart), Food Removed (from cart), Ordered, Prepared, Packaged, Queued, Curbside-Arrived, Curbside-Delivered, Paid, and Reviewed, according to an example embodiment.

For travel, booking and riding may follow these states: Trip Requested, Driver

Assigned, Customer Cancelled, Driver Cancelled, Customer Waiting, Driver Arrived, Trip Started, Payment Received, Trip Done, and Rating Done, according to an example embodiment.

Mobile UI, Web UI: a coded state machine can be used to present the app display based on user inputs & actions that may involve controlling screen activities such as hiding some detailed data, enabling buttons to select, offering recommendations, and placing ads, according to an example embodiment.

Although the invention is illustrated and described herein as embodied in a distributed state engine rule processing system, the invention should not be limited to the details shown in those embodiments because various modifications and structural changes may be made without departing from the spirit of the invention while remaining within the scope and range of equivalents of the claims, according to an example embodiment.

The various embodiments of the invention described herein should not be limited to the description, even with the reference to the accompanying figures and drawings depicted herein, according to an example embodiment. The invention may be embodied in different forms and should not be restricted at set forth, according an example embodiment. The following provides a logical view of the system, according an example embodiment.

FIG. 1 depicts an example state diagram 100 of an example system according to the prior art, discussed further below.

FIG. 2 is an example illustration 200 of a high-level state diagram processing flow 200 for example customs processing, according to an example embodiment, including but not limited to, example, but nonlimiting, components, including Shipment Arrived 202, At Customs 204, Payment of Taxes and Fees 206, and Shipment Cleared 208, discussed further below.

FIG. 3 is an example state diagram 300 for an example finite state machine 300 for an example SmartPass App, according to an example embodiment, including but not limited to, example, but nonlimiting, components, including Source 302, Shipment Event Data Receiver 304, Shipment Event Queue 306, Starting of SmartPass 308, Shipment Ready for Customs Service 310, Shipment In Transit Service 312, Shipment Action Queue 314, Edit SmartPass Docs Service 316, Enable Doc Upload Service 318, Update SmartPass Service 320, and Shipment Record Database 322, discussed further below.

FIG. 4 is an example schematic logical block diagram 400 illustrating a depiction of an example rule engine 402 and including, but not limited to, example, but nonlimiting, components, including rule repository 404, Rule Editor 406, Engine Execution Core 408, Reporting 410 according to an example embodiment, discussed further below.

FIG. 5 is an example state diagram 500 illustrating an example lifecycle 500 of an asset such as an example SmartPass, and including, but not limited to, example, but nonlimiting, components, states, Start SmartPass 502, In Transit 504, Decision All Required Documents Received 506, Ready For Customs 508, At Customs 510, Rejected by Customs 512, Released by Customs 514, On Hold by Customs 516, and Completed SmartPass 518, according to an example embodiment, all discussed further below. As illustrated in the diagram FIG. 5, various transitions between states may be shown, according to an example embodiment.

Figure 6:
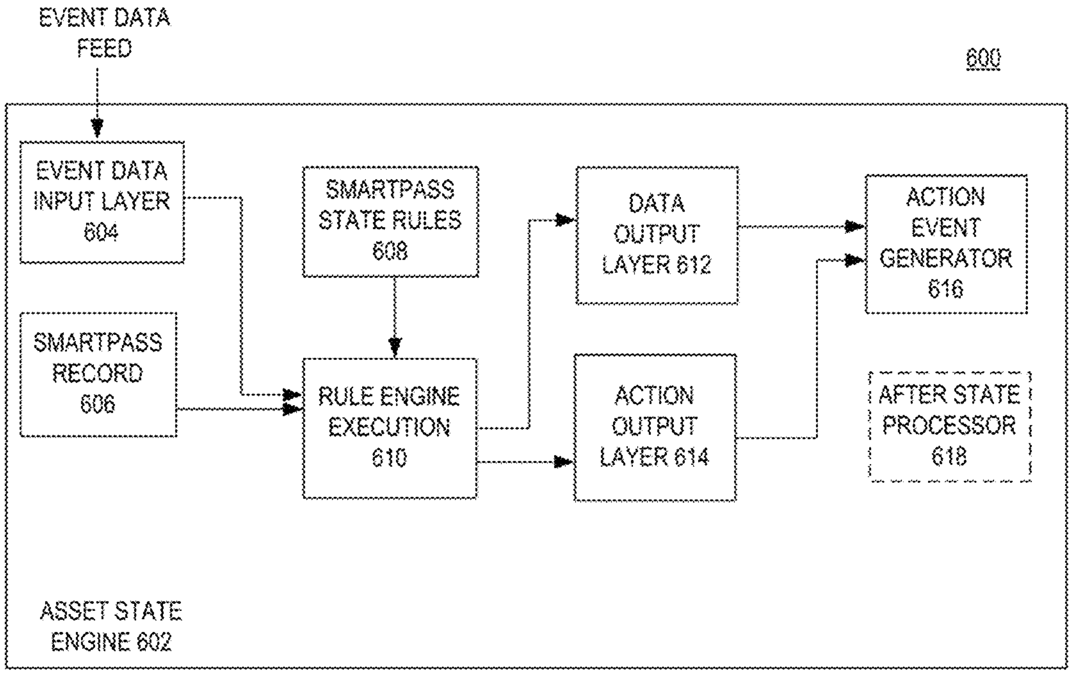
FIG. 6 is an example state diagram, according to an example embodiment.

FIG. 6 is an illustration depicting an example state diagram 600, and including, but not limited to, example, but nonlimiting, components, Asset State Engine 602, Event Data Input Layer 604, SmartPass Record 606, SmartPass State Rules 608, Rule Engine Execution 610, Data Output Layer 612, Action Output Layer 614, Action Event Generator 616, After State Processor 618, according to an example embodiment, all discussed further below.

Figure 7:
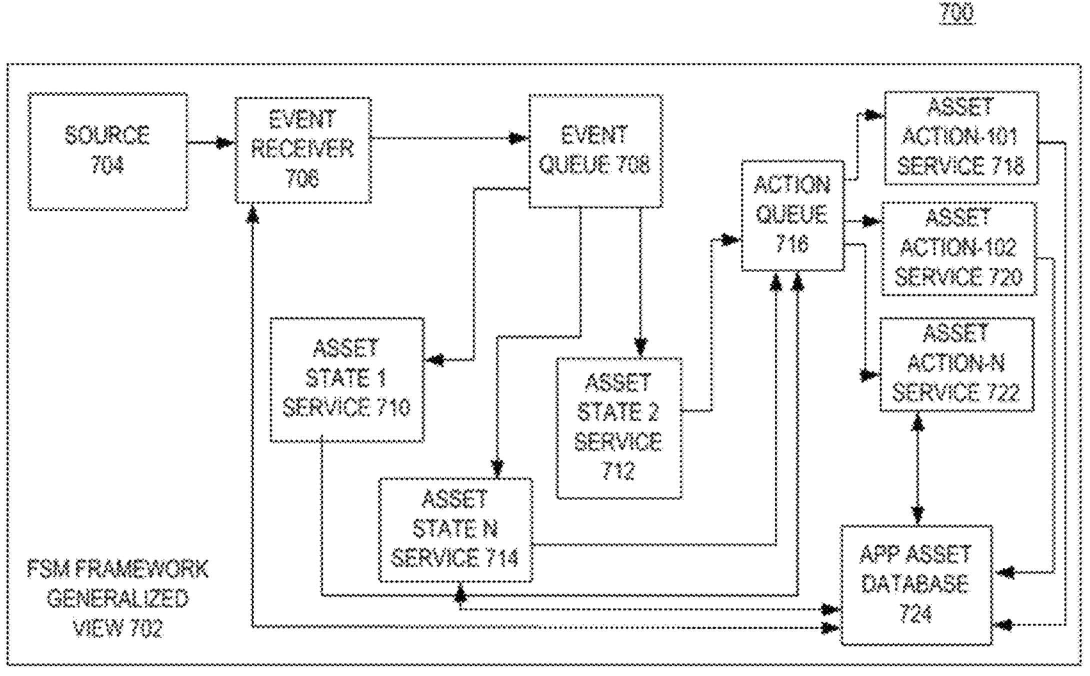
FIG. 7 is an example state diagram illustrating an example general finite state machine, according to an example embodiment.

FIG. 7 is an example state diagram 700 illustrating an example general finite state machine 700, and including, but not limited to, example, but nonlimiting, components, FSM Framework Generalized View 702, Source 702, Event Receiver 706, Event Queue 708, Asset State 1 Service 710, Asset State 2 Service 712, Asset State n Service 714, Action Queue 716, Asset Action—101 Service 718, Asset Action—102 Service 720, Asset Action-n Service 722, App Asset Database 724, according to an example embodiment, all discussed further below.

Figure 8:
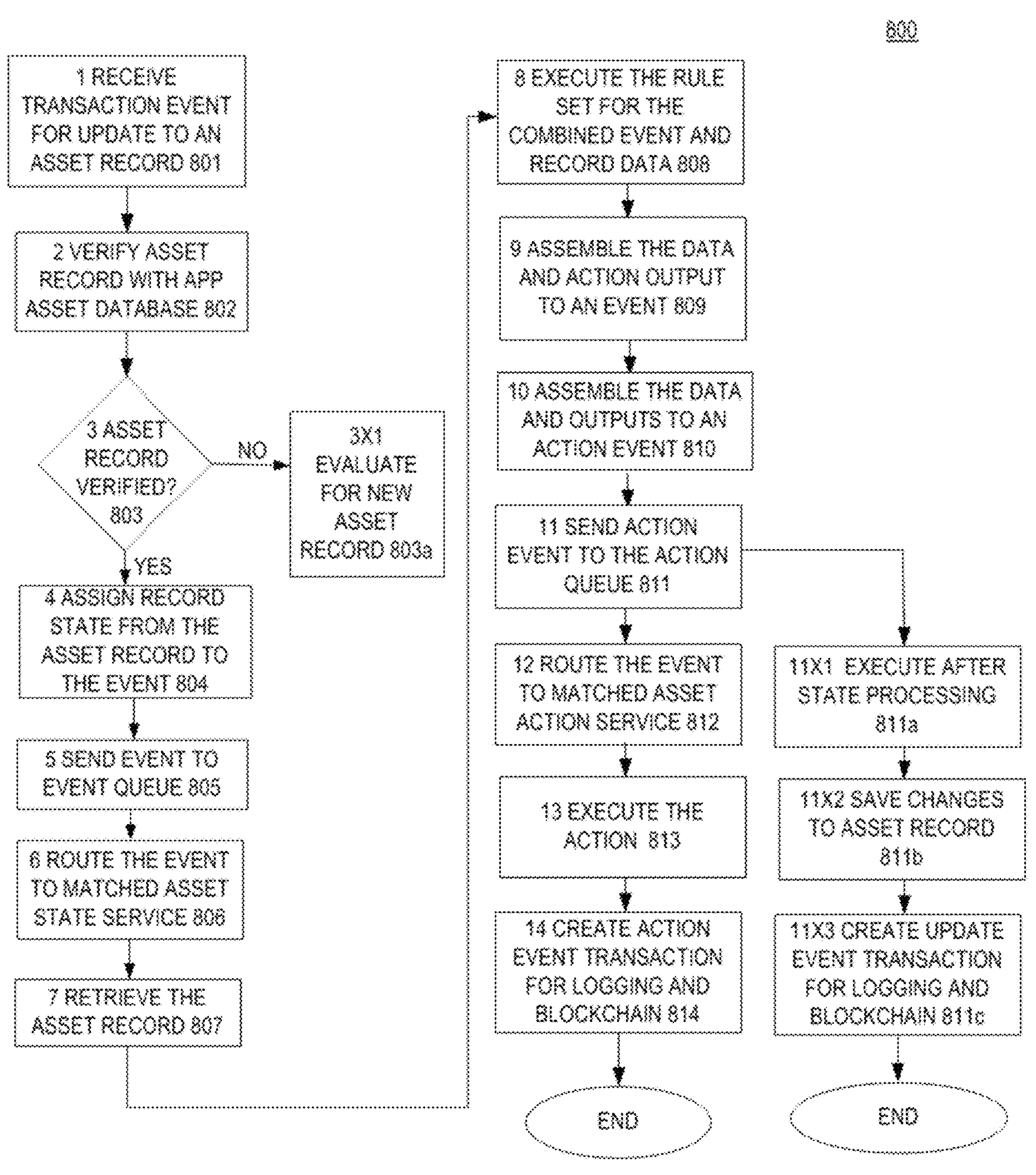
FIG. 8 is an example flowchart illustrating an example finite state machine framework, according to an example embodiment.

FIG. 8 is an example flowchart 800 illustrating an example finite state machine framework flow diagram 800, beginning with 801 including, but not limited to, example, but nonlimiting, states, according to an example embodiment, discussed further below.

In 801, flow diagram 800 receives a transaction event for update to an asset record, and may immediately continue with 802, according to an example embodiment.

In 802, flow diagram 800 verifies the asset record with the app asset database, and may immediately continue with 803, according to an example embodiment.

In 803, flow diagram 800 determines if the asset record is verified, if so may immediately continue to 804, or if not may continue with 803*a*, according to an example embodiment.

In 803*a*, flow diagram 800 evaluates for a new asset record, according to an example embodiment.

In 804, flow diagram 800, assigns record state from the asset record to the event and may immediately continue with 805, according to an example embodiment.

In 805, flow diagram 800, sends event to event queue and may immediately continue with 806, according to an example embodiment.

In 806, flow diagram 800, routes the event to matched asset state service and may immediately continue with 807, according to an example embodiment.

In 807, flow diagram 800, retrieves the asset record and may immediately continue with 808, according to an example embodiment.

In 808, flow diagram 800, executes the rule set for the combined event and record data and may immediately continue with 809, according to an example embodiment.

In 809, flow diagram 800, assembles the data and action output to an event and may immediately continue with 810, according to an example embodiment.

In 810, flow diagram 800, assembles the data and outputs to an action event and may immediately continue with 811, according to an example embodiment.

In 811, flow diagram 800, sends action event to the action queue 811*a* and may immediately continue with 812, according to an example embodiment.

In 811*a*, flow diagram 800, executes after state processing and may immediately continue with 811*b*, according to an example embodiment.

In 811*b*, flow diagram 800, saves changes to the asset record and may immediately continue with 811*c*, according to an example embodiment.

In 811*c*, flow diagram 800, creates update event transaction for logging and blockchain and may immediately end, according to an example embodiment.

In 812, flow diagram 800, routes the event to matched asset action service and may immediately continue with 813, according to an example embodiment.

In 813, flow diagram 800, executes the action and may immediately continue with 814, according to an example embodiment.

In 814, flow diagram 800, creates action event transaction for logging and blockchain and may immediately end, according to an example embodiment.

FIG. 9 depicts an example embodiment of an example component level example hardware architecture 900 for an example computing device as may be used for any of various example hardware subsystem components of an example system, according to one example embodiment, discussed further below.

FIG. 10 depicts an example embodiment illustrating an example system level hardware architecture 1000 for an example application server, web server embodiment of an example service provider system for providing an example software architecture of various example subsystem components of an example networking system, which may be used to implement, according to one example embodiment, discussed further below.

For this disclosure, a method involving an FSM for data and events for the shipment of goods through customs processing is described in FIG. 5, according to an example embodiment. This state machine includes these eight states: Start 502, In_Transit 504, Ready for Customs 508, At Customs 510, Released 514, Rejected 512, On Hold 516, and Completed 518, according to an example embodiment. The collection of data and events over the lifecycle for the shipment as depicted in FIG. 5 for this state-based processing is called "SmartPass", according to an example embodiment.

Referring to example state flow diagram 300 illustrated in FIG. 3, for a new shipment event transaction, a SmartPass is created with its initial data from the event saved to the new SmartPass Record in the Shipment Database, according to an example embodiment.

The initial state is assigned 'Start SmartPass', according to an example embodiment. In this state, several automatic processes are performed, according to an example embodiment. The SmartPass create event is registered and saved to the blockchain ledger, according to an example embodiment. The SmartPass can obtain verification from the SmartPass Party owner, according to an example embodiment. The SmartPass can obtain verification about the shipment status from a 3$^{rd}$ party tracking system, e.g., a vessel tracking system, according to an example embodiment. These can all be assigned by rules applied to the 'Start SmartPass' state, according to an example embodiment.

Referring to the illustration of example state flow diagram 300 of FIG. 3, when event data from a registered 01 Source for a shipment is received at the 02 Shipment Event Data Receiver, the event data is matched by query to the 11 Shipment Record Database with the corresponding Shipment Data Record (SDR) or SmartPass Record from the shipment database, according to an example embodiment. If a SmartPass Record is not found, then the event data is evaluated for creating and starting a new SmartPass as described earlier, according to an example embodiment. For this situation, the event data is routed through the 03 Ship Event Queue to the service Start SmartPass 04, according to an example embodiment. For the matching SmartPass Record situation, the disclosed method obtains the record state or shipment state from the SmartPass, according to an example embodiment. With this record state, the disclosed method uses the 03 Shipment Event Queue combined with an event router to assign both the event and SmartPass to a separate App Node Service from a cluster of services, according to an example embodiment. This selected service is chosen based on the Shipment State, where this Shipment State is assigned to an App service type, according to an example embodiment. For the disclosed method, there are at least eight App service types with each type corresponding to one of the states from the SmartPass state diagram: Start, In_Transit, Ready for Customs, At Customs, Released, Rejected, On Hold, and Completed Start, In_Transit, Ready for Customs, At Customs, Released, Rejected, On Hold, and Completed, according to an example embodiment. In example state flow diagram 300 illustrated in FIG. 3, three of these services are shown as '04 Start SmartPass', '05 Shipment In_Transit,' and '06 Shipment Ready_for_customs' services, according to an example embodiment.

In_Transit State

Referring to diagram 500 of FIG. 5 for the In_Transit state, several transaction events are identified and described as follows, according to an example embodiment.

SHIPPING_DOC_RECIEVED: A document has either been received in the upload queue or a request to send a document Special Edits (e.g., Document changes)

Edits, Updates, Vessel GPS

Queries for one or more SmartPasses that are in the In_Transit State, according to an example embodiment.

When any of these events are received during the In_Transit state for the SmartPass, the event will be routed as illustrated in FIG. 3 from the 02 Shipment Event Data Receiver through the 03 Shipment Event Queue to the 06 Shipment In_Transit Service, according to an example embodiment. The 06 Shipment In_Transit Service will process the event and provide two results:

1. An indication of the outcome for evaluating the event data in combination with the SmartPass Record
2. 0 or more Actions to execute, according to an example embodiment.

The 06 Shipment In_Transit Service will send the Action(s) to the 07 Shipment Action Queue, according to an example embodiment. By default, all Record States send their concluded Action(s) to the 07 Shipment Action Queue, according to an example embodiment. As can be seen in FIG. 1, the other illustrated Record States 05 and 06 are shown as sending their Action(s) to the 07 Shipment Action Queue, according to an example embodiment.

The 07 Shipment Action Queue routes Actions based on Action Type identifiers received from the App Node Service, according to an example embodiment. FIG. 1 shows three Actions that can be performed as '08 Edit SmartPass Docs', '09 Enable Doc Upload Service', and '10 Update SmartPass Service", according to an example embodiment. An alternative design for the Action Service is to have one Service that can perform all Actions and the 07 Shipment Action Queue invokes the Action as an API on the Service, according to an example embodiment. Since this would be a stateless service, the number of such Services could be replicated and the 07 Shipment Action Queue could load balance by calling different Services across a distribution of them with different load and scaling strategies, according to an example embodiment.

In state diagram 500 of FIG. 5, an automatic trigger leaves the In_Transit State into a Decision Point labeled as "All Required Docs received?" This indicates an evaluation that can be executed outside the rules for the Record State in an 'After State' or 'After Request' position, according to an example embodiment. This is to evaluate if the In_Transit State should transition to the Ready For Customs State, according to an example embodiment. This 'After State' is evaluated within the App Node Service within a separate evaluation component called the "After State Processor" as shown, as illustrated in example asset state engine and flow diagram 600 in FIG. 6, according to an example embodiment.

The After State Processor can be assigned for all Asset State Engines as the software component that evaluates the Service based on its Record State, according to an example embodiment. For example, for the Asset State Engine 600 depicted in the illustration of FIG. 6 implemented in a Docker container, the After State Processor would be installed in each Docker container instance, according to an example embodiment. When the Asset State Engine completes processing, the After State Processor is automatically executed, according to an example embodiment. In the Python Flask framework, this is the "after_request" handler, according to an example embodiment. In Node.js this is done with middleware using a combination of 'close' and 'finish' or using middleware directly on the API parameter list, according to an example embodiment. A further description of this is provided in the section "Asset State Engine Process Flow", according to an example embodiment.

Ready for Customs State

For the SmartPass state diagram, as illustrated in example SmartPass Lifecycle state diagram 500 in FIG. 5, the transition from In_Transit to Ready for Customs is the yes/no criteria that evaluates all required Customs Processing documents have been received, according to an example embodiment. Once this has been determined, the shipment state of the SmartPass Record is assigned to 'Ready for Customs' and saved to the 11 Shipment Record Database, according to an example embodiment. Referring to FIG. 5, Ready for Customs receives four triggers as:

Approved: the Party at a system user interface selects to approve the SmartPass to proceed to Customs Processing or an automatic evaluation of the SmartPass is performed and selects to approve the SmartPass, according to an example embodiment.

Print, Review, Confirm: The Party at a system user interface selects to print or review the SmartPass documents and data contents, according to an example embodiment. The user can select to verify or confirm they have reviewed the contents, according to an example embodiment.

Not Yet: The Party at a system user interface selects to withhold the SmartPass indicating that it is not completed, e.g., an incorrect document was received or incorrectly assigned and needs to be corrected, according to an example embodiment. This will transition the SmartPass to the In_Transit State, according to an example embodiment.

Other Events: Other events can arrive that include data update for GPS coordinates, a report on port status, or another document arrived that is not required for Customs Processing, according to an example embodiment. These are processed and the Record State remains in the Ready For Customs state, according to an example embodiment.

At Customs State

The transition from Ready for Customs to At Customs is triggered by approval from the Party selecting, using a UI or button in an App, to approve the SmartPass or by an automatic evaluation, according to an example embodiment. The transition creates an event transaction and invokes an Action for a Notary of the transaction to the internal blockchain and also for the external notary blockchain as indicated in example SmartPass Lifecycle State flow diagram 500 of FIG. 5 as 'Notary IN/EX', according to an example embodiment. In the At Customs state as shown, illustrated in example state flow diagram 500 in FIG. 5, four triggers as follows:

Print, Review, Notes: the Customs Processing Party at a Customs user interface selects to print or review the Smart document and data contents, according to an example embodiment. The Party can select to add notes or annotations, according to an example embodiment.

Hold: the Customs Processing Party at a Customs user interface selects to assign the SmartPass with a Hold condition due for various reasons that may be documented in the notes, according to an example embodiment.

Reject: the Customs Processing Party at a Customs user interface selects to assign the SmartPass with a reject condition due to various reasons that may be documented in the notes, according to an example embodiment.

Release: the Customs Processing Party at a Customs user interface selects to assign the SmartPass with a release condition indicating that the SmartPass has been approved, according to an example embodiment.

For the triggers for Hold, Reject, and Release, the At Customs state moves or transitions to On Hold, Rejected, and Completed states, respectively, according to an example embodiment. For the On Hold and Rejected states, the Customs Processing Party at a Customs user interface can select to release the SmartPass at which those states change to the Released state, according to an example embodiment. The Released state is an indication of the Customs Processing Party approval, according to an example embodiment. For all transitions triggered by the Customs Processing Party decisions, an event transaction is created and the Action invoked for a Notary of the transaction to the internal blockchain and the external notary blockchain as indicated in FIG. 5 as 'Notary IN/EX', according to an example embodiment.

Within the Released state, the disclosed method performs automated processes that may include getting digital signatures on documents and data, packaging the SmartPass to a designated completion data format, data logging, and other common operating functions, according to an example embodiment.

Finally, after the automated processes are completed, the SmartPass state is transitioned to completed, according to an example embodiment. An event transaction is created and the Action invoked for a Notary of the transaction to the internal blockchain and the external notary blockchain, according to an example embodiment.

Asset State Engine Process Flow

The block diagram for the Asset State Engine 600 of FIG. 6 is an example derivation of the general Rule Engine diagram shown in FIG. 3 with the enhancements for these components, as illustrated in example asset state engine flow diagram 600:

Event Data Input Layer: API for receiving event data corresponding to the Asset Record and for rule set evaluation, according to an example embodiment.

Asset or SmartPass Record: data record stored in the App Asset Database, Shipment Record Database for the SmartPass, that is subject to the FSM evaluations, according to an example embodiment.

Asset or SmartPass Rules: Executable code written in rule format that evaluates the combined data set of the Asset Record and received event data, according to an example embodiment.

Rules Engine Execution: Performs the rule computations and evaluations on the combined data set of the Asset Record and received event data and provides resulting data and prescribed actions, according to an example embodiment.

Data Output Layer: Shared memory area for the resulting Rule Engine data, according to an example embodiment.

Action Output Layer: Shared memory area for the resulting Rule Engine prescribed actions, according to an example embodiment.

Action Event Generator: Combines the Data Output Layer and the Action Output Layers into a Transaction Event that is fed to the Action Queue for follow-on downstream processing, according to an example embodiment.

General FSM Framework Block Diagram

FIG. 7 is a generalized view 700 of the FSM Framework from diagram 300 of FIG. 3, according to an example embodiment. The difference is that FIG. 3 is application domain-specific to Customs Processing for imports as part of the Supply Chain for the shipment of goods and services, according to an example embodiment. FIG. 7 provides the FSM Framework language for describing the components, the data flow, and events, as illustrated in example flow diagram 700, according to an example embodiment. This facilitates specializing the FSM Framework for other unique State Machine based applications, according to an example embodiment.

General Process Flow for the FSM Framework

Using the diagrams in FIG. 7 and FIG. 8 the logical Process flow 800 is illustrated in an example depiction, through the FSM Framework that is an example direct path, one of many, through the FSM diagram in FIG. 5, according to an example embodiment. This FIG. 8 depicts an example sequence of the order of processing, according to an example embodiment, for Event Receiving, Asset State Services, Asset Actions, and After State Processing, according to an example embodiment. Unlike the FSM diagram in FIG. 5, flow diagram 800 of FIG. 8 does not separate out the State-based Processing, according to an example embodiment.

FIG. 9 depicts an example embodiment of a hardware architecture block diagram 900 for an example computing or communications device as may be used for any of various example buyer devices, example seller devices, example financial institution devices, example nonfungible token (NFT) devices, notification and/or authentication devices, example state machines, example shipment arrived state machine, example at customs state machine, example pay tax fees computing device, example shipment cleared computing device, example cargo departed port for in country file paperwork state machine event processor, example source device, example shipment event data receiver, example shipment event queue, example start SmartPass, example shipment in transit service, example shipment ready for customs service, example shipment action queue, example edit SmartPass Docs service, example enable doc upload service, example update SmartPass service, example shipment record database state machine, example rule engine, example rule repository, example rule editor, example engine execution core, example reporting subsystem, example SmartPass state diagram execution processors, state machines, example event data feeds, event data input layer devices, SmartPass record devices, Asset state engine devices, SmartPass State rules, rule engine execution, data output layer and action output layer devices, action event generators, after state processors, flow diagram execution processors, example state machine devices, flow diagram elements, state engines, event receiver devices, source devices, asset state devices, event queue devices, action queue devices, app asset state databases and/or services, FSM framework components, smarthub devices, cryptocurrency exchange devices, as well as example computing devices of users, mobile devices, network communication components, routers, gateways, etc., according to an example embodiment of the present invention.

FIG. 9 depicts an exemplary schematic block diagram 900 illustrating an exemplary computer/communications device hardware architecture as may be used in various exemplary components of an exemplary embodiment including user devices various example buyer devices, example seller devices, example financial institution devices, example non-fungible token (NFT) devices, notification and/or authentication devices, example smarthub devices, cryptocurrency exchange devices, as well as example computing devices of users, mobile devices, network communication components, routers, gateways, etc., computer device(s), bank devices, merchant devices, payment service provider devices, other computing or communications devices, routers, application servers, web servers, cloud-based computing devices, communication devices, switches, routers, gateways, telephone devices, mobile devices, content servers, web servers, database servers and/or other application servers, enduser devices, operations center devices, client and/or server devices, network routers, gateways, access points, and the like, according to various exemplary embodiments.

FIG. 9 depicts an exemplary schematic block diagram 900 illustrating an exemplary computer/communications device hardware architecture as may be used in various exemplary components of an exemplary embodiment including mobile devices, wearables, cloud-based computing devices, content servers, web servers, database servers and/or other application servers, according to various exemplary embodiments. Diagram 900 may include any of various exemplary computer systems as may be used as an external computer device, an internal and/or STB or SOC, a mobile device, a wearable, a client, or server, web server, application server, and/or any other of the computing devices included in the other drawings, according to various exemplary embodiments. FIG. 9 depicts an exemplary diagram 900 illustrating an exemplary computer/communications device hardware architecture as may be used in various components of exemplary embodiments of the present invention. FIG. 9 depicts an exemplary view 900 of exemplary computer systems such as those represented in FIGS. 1-9, 10, etc., including devices which may execute various modules, including components, systems, devices, computers, processors, mobile devices, routers, gateways, network devices, other computing and/or network devices, network monitoring and security operations data analysis computing devices which may execute various operating system and software components on such computing devices and/or subsystem devices and hardware/software modules as may be represented by devices implied by, or perform steps illustrated in various flowchart diagrams as illustrated in the figures by elements 101-113, 201-205, 900, 1000, etc., as may be used in implementing an exemplary embodiment of the present invention. FIG. 9 depicts an exemplary embodiment of a computer system that may be used in computing devices including those shown and not shown, such as, e.g., but not limited to, service provider computing devices, smarthub systems, buyer computing devices, supplier computing devices, digital financial services computing devices, public blockchain for proxy nft computing devices, data repository processing and/or storage computing devices, network devices, communication devices, authentication devices, notification devices, requesting devices, response devices, cryptocurrency exchange related devices, NFT related devices, traditional financial services and/or fiat currency processing computing devices, electronic funds transfer (EFT) related devices, network monitoring and analysis devices of example operations illustrated example environment 1000, computing devices 900, devices, servers, application servers, web servers, other wearable and/or mobile devices, sensor capture devices, routers, gateways, data network communication equipment, according to an exemplary embodiment of the present invention. FIG. 9 depicts an exemplary embodiment of a computer system that may be used as client device, a server device (not shown), a network component, router, packet monitor/analyzer, server device, storage, and/or cloud based storage device, application servers, and/or web servers, etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 900 is shown in FIG. 9, depicting an exemplary embodiment of a block diagram of an exemplary computer system useful for implementing the present invention. Specifically, FIG. 9 illustrates an example computer 900, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/7/8/10, etc. available from MICROSOFT® Corporation of Redmond, Wash, U.S.A., SOLARIS® from SUN® Microsystems of Santa Clara, Calif, U.S.A, OS/2 from IBM® Corporation of Armonk, N.Y, U.S.A, Mac/OS, Mac OSX, iOS, from APPLE® Corporation of Cupertino, Calif, U.S.A, etc., or any of various versions of UNIX® (a trademark of the Open Group of San Francisco, Calif, USA) including, e.g., LINUX®, UBUNTU, HPUX®, IBM AIX®, and SCO/UNIX®, etc., ANDROID, Android OS is available from Google, JAVA from Oracle, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 900 is shown in FIG. 9. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, a tablet, a phone, a mobile phone, a cellular phone, a communications device, an iPhone, iOS, a smartphone, an iPad, a tablet based device, an ANDROID OS device, an iOS device, a Symbian based device, a Windows 8, 10, 11, etc., device, etc., may also be implemented using a computer such as that shown in FIG. 9.

The computer system 900 may include one or more processors, such as, e.g., but not limited to, processor(s) 904, which may include microprocessors, coprocessors, nanoprocessors, microcontrollers, systems on a chip (SOC), multiprocessor systems, parallel processors, CISC type processors, RISC type processors, POWER type processors, ARM-architecture processors, massively parallel processor, graphic processors (GPUs) 932, cryptographic processors such as, e.g., but not limited to, encryption/decryption processor 936, quantum computers, etc. The processor(s) 904 may be connected to a communication infrastructure 906 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 900 may include a display interface 902 that may forward, e.g., but not limited to, graphics, text, and other data, etc., from the communication infrastructure 906 (or from a frame buffer, etc., not shown) for display on the display unit 930, and/or GPU 932, and/or touchscreen 934, and/or other input or output, and/or input and output device, sensor-based device, etc.

The computer system 900 may also include, e.g., but may not be limited to, a main memory 908, random access memory (RAM), and a secondary memory 910, etc. The secondary memory 910 may include, for example, (but not limited to) a hard disk drive 912 and/or a removable storage drive 914, representing a floppy diskette drive, a magnetic tape drive, an optical disk drive, a compact disk drive CD-ROM, DVD, Personal Cloud storage, redundant array of inexpensive disks (RAID) array, etc. The removable storage drive 914 may, e.g., but not limited to, read from and/or write to a removable storage unit 918 in a well-known manner. Removable storage unit 918, also called a program storage device or a computer program product, may represent, e.g., but not limited to, a floppy disk, magnetic tape, optical disk, compact disk, etc. which may be read from and written to by removable storage drive 914. As will be appreciated, the removable storage unit 918 may include a computer usable storage medium having stored therein computer software and/or data.

In alternative exemplary embodiments, secondary memory 910 may include other similar devices for allowing computer programs or other instructions to be loaded into computer system 900. Such devices may include, for example, but not limited to, a removable storage unit 922 and an interface 920. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, FLASH memory, application specific integrated circuits (ASICs), field programmable gate arrays (FPGAs), and/or other removable storage units 922 and interfaces 920, which may allow software and/or data to be transferred from the removable storage unit 922 to computer system 900.

The computing device 900 may also include a cloud-accessible or cloud-based processing and/or storage solution as may be available from Amazon Web Services available from Amazon of Seattle, WA USA, or Azure cloud available from Microsoft Corporation of Redmond, WA USA, or Google Cloud Service available from Google of Alphabet Corporation, Mountain View, CA USA, among many other network and software communications offerings available from IBM Corporation, Oracle Corporation, and others.

Computer 900 may also include an input device such as, e.g., (but not limited to) a mouse or other pointing device such as a digitizer, touch-based sensor, and/or a keyboard and/or other data entry device (none of which are labeled).

Computer 900 may also include output devices, such as, e.g., (but not limited to) display 930, and display interface 902. Computer 900 may include input/output (I/O) devices such as, e.g., (but not limited to) communications interface 924, cable 928 and communications path 926, etc. These devices may include, e.g., but not limited to, a network interface card, and modems (neither are labeled). Communications interface 924 may allow software and data to be transferred between computer system 900 and external devices. Examples of communications interface 924 may include, e.g., but may not be limited to, a modem, a network interface (such as, e.g., an Ethernet card), a communications port, a Personal Computer Memory Card International Association (PCMCIA) slot and card, etc. Software and data transferred via communications interface 924 may be in the form of signals 928 which may be electronic, electromagnetic, optical or other signals capable of being received by communications interface 924. These signals 928 may be provided to communications interface 924 via, e.g., but not limited to, a communications path 926 (e.g., but not limited to, a channel). This channel 926 may carry signals 928, which may include, e.g., but not limited to, propagated signals, which may be stored in nontransitory form, and may be implemented using, e.g., but not limited to, wire or cable, local and/or wide area network (LAN/WAN) protocols, Ethernet, Token Ring, FDDI, carried over andy of various physical media, fiber optics, a telephone line, twisted pair, shielded twisted pair, a cellular link, a radio frequency (RF) link, wireless communications, spread spectrum, orthogonal frequency division multiplexing (OFDM), and/or other communications channels, etc.

In this document, the terms "computer program medium" and "computer readable medium" may be used to generally refer to media such as, e.g., but not limited to removable storage drive 914, a hard disk installed in hard disk drive 912, and signals 928, etc. These computer program products may provide software to computer system 900. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct or indirect physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device modified as set forth herein to perform the processing as described to be selectively activated or reconfigured by a software program stored in the device to become a special purpose device capable of performing the subsystem's or submodule's performance functionality and computer and communications systems instructions, and/or by hardware processing such as, e.g., but not limited to, performing certain trusted platform system processing, including exemplary key based encryption/decryption, network monitoring, packet inspection and the like, according to exemplary embodiments.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.) when nontransitory, and others.

Computer programs (also called computer control logic), may include object-oriented computer programs, and may be stored in main memory 908 and/or the secondary memory 910 and/or removable storage units 914, also called computer program products. Such computer programs, when executed, may enable the computer system 900 to perform the features of the present invention as discussed herein. In particular, the computer programs, when executed, may enable the processor 904 to provide a method to resolve conflicts during data synchronization according to an exemplary embodiment of the present invention. Accordingly, such computer programs may represent controllers of the computer system 900.

Various artificial intelligence based analysis techniques may be used herein including neural networks, machine learning, any of various well-known AI and ML techniques and processes (e.g., reinforcement learning, dynamic programming, state action reward state action (SARSA), q learning, supervised learning, unsupervised learning, large language models (LLMs), natural language search and interactive request and response, neural networks, convolutional neural networks, statistical heuristics, topic identification and classification, linguistics and semantic processing, tensorflow and openAI libraries, cloud computing services, specific APIs, Microsoft cognitive services, Google cloud AI, Watson AI, offerings from Amazon, Facebook, Baidu, Apple, and others, etc.), and output of such algorithms may be analyzed further as set forth herein to obtain feature vectors and other data which may be used to provide further guidance to users, and/or be integrated for further processing and analysis, authentication, access control, and/or encryption/decryption processing, and coupled via decision support systems, executive information systems, and other graphical user interface enabled network and cyber security monitoring and threat analysis management and processing.

In another exemplary embodiment, the invention may be directed to a computer program product may include a computer readable medium having control logic (computer software) stored therein. The control logic, when executed by the processor 904, may cause the processor 904 to perform the functions of the invention as described herein. In another exemplary embodiment where the invention may be implemented using software, the software may be stored in a computer program product and loaded into computer system 900 using, e.g., but not limited to, removable storage drive 914, hard drive 912 or communications interface 924, etc. The control logic (software), when executed by the processor 904, may cause the processor 904 to perform the functions of the invention as described herein. The computer software may run as a standalone software application program running atop an operating system or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

According to an exemplary embodiment, the application system can include an electronic decision support system (DSS) (not shown), policy-based trust platform systems, which can interact, e.g., but not limited to, with computer database management system (DBMS) 907, and/or electronic interactive, graphical user interface (GUI) system. Each of the exemplary DSS, DBMS and/or EIGUI system, can then, using e.g., but not limited to, a cryptographic processor and/or a crypto chip controller processor 936, or the like, can then encrypt the data using electronic encryptor, which can make use of one or more cryptographic algorithm electronic logic, which can include encryption code, a cryptographic combiner, etc., and may be stored in encrypted form, according to an exemplary embodiment, in a computer database storage facility, from computer database storage device, and from there the process can continue with use of the cryptographic algorithm electronic logic, and electronic decryptor, which can decrypt and/or provide a process for decrypting encrypted data, and/or by providing such data to the DSS, the DBMS, or the EIGUI, if authorized. By using encryption/decryption, certain algorithms can be used, as described herein, including, e.g., but not limited to, checksum, AES encryption, RSA, PKI, TLS, FTPS, SFTP, etc. and/or other cryptographic algorithms and/or protocols, according to exemplary embodiments.

Cryptographic Functions

Cryptographic systems, according to an exemplary embodiment, can provide one or more of the following four example services. It is important to distinguish between these, as some algorithms are more suited to particular tasks, but not to others. To protect patient data, personal data can be encrypted prior to storage and can be decrypted before accessing the data, according to an exemplary embodiment. When analyzing requirements and risks, one needs to decide which of the four functions should be used to protect the proprietary data, according to an exemplary embodiment.

Authentication

Using a cryptographic system, according to an exemplary embodiment, one can establish the identity of a remote user (or system). A typical example is the SSL certificate of a web server providing proof to the user device that user device is connected to the correct server, according to an exemplary embodiment.

The identity is not of the user, but of the cryptographic key of the user. Having a less secure key lowers the trust one can place on the identity, according to an exemplary embodiment.

Non-Repudiation

The concept of non-repudiation is particularly important for financial or e-commerce applications, according to an exemplary embodiment. Often, cryptographic tools are required to prove that a unique user has made a transaction request, according to an exemplary embodiment. It must not be possible for the user to refute his or her actions, according to an exemplary embodiment.

For example, a customer can request a transfer of money from her account to be paid to another account, according to an exemplary embodiment. Later, she claims never to have made the request and demands the money be refunded to the account. If one has non-repudiation through cryptography, one can prove-usually through digitally signing the transaction request, that the user authorized the transaction.

Confidentiality

More commonly, the biggest concern can be to keep information private, according to an exemplary embodiment. Cryptographic systems, according to an exemplary embodiment, have been developed to function in this capacity. Whether it be passwords sent during a log on process, or storing confidential proprietary financial data in a database, encryption can assure that only users who have access to the appropriate key can get access to the proprietary data.

Integrity

One can use cryptography, according to an exemplary embodiment, to provide a means to ensure data is not viewed or altered during storage or transmission. Cryptographic hashes for example, can safeguard data by providing a secure checksum, according to an exemplary embodiment.

Cryptographic Algorithms

Various types of cryptographic systems exist that have different strengths and weaknesses, according to an exemplary embodiment. Typically, the exemplary cryptographic systems can be divided into two classes; 1) those that are strong, but slow to run, and 2) those that are quick, but less secure. Most often a combination of the two approaches can be used, according to an exemplary embodiment (e.g.: secure socket layer (SSL)), whereby we establish the connection with a secure algorithm, and then if successful, encrypt the actual transmission with the weaker, but much faster algorithm.

Symmetric Cryptography

Symmetric Cryptography, according to an exemplary embodiment, is the most traditional form of cryptography. In a symmetric cryptosystem, the involved parties share a common secret (password, pass phrase, or key), according to an exemplary embodiment. Data can be encrypted and decrypted using the same key, according to an exemplary embodiment. These symmetric cryptography algorithms tend to be comparatively fast, but the algorithms cannot be used unless the involved parties have already exchanged keys, according to an exemplary embodiment. Any party possessing a specific key can create encrypted messages using that key as well as decrypt any messages encrypted with the key, according to an exemplary embodiment. In systems involving a number of users who each need to set up independent, secure communication channels, symmetric cryptosystems can have practical limitations due to the requirement to securely distribute and manage large numbers of keys, according to an exemplary embodiment.

Common examples of symmetric algorithms include, e.g., but not limited to, DES, 3DES and/or AES, etc. The 56-bit keys used in DES are short enough to be easily brute-forced by modern hardware and DES should no longer be used, according to an exemplary embodiment. Triple DES (or 3DES) uses the same algorithm, applied three times with different keys giving it an effective key length of 128 bits, according to an exemplary embodiment. Due to the problems using the DES algorithm, the United States National Institute of Standards and Technology (NIST) hosted a selection process for a new algorithm. The winning algorithm was Rijndael and the associated cryptosystem is now known as the Advanced Encryption Standard or AES, according to an exemplary embodiment. For most applications 3DES, according to an exemplary embodiment, is acceptably secure at the current time, but for most new applications it is advisable to use AES, according to an exemplary embodiment.

Asymmetric Cryptography (Also Called Public/Private Key Cryptography)

Asymmetric algorithms, according to an exemplary embodiment, use two keys, one to encrypt the data, and either key to decrypt. These inter-dependent keys are generated together, according to an exemplary embodiment. One key is labeled the Public key and is distributed freely, according to an exemplary embodiment. The other key is labeled the Private Key and must be kept hidden, according to an exemplary embodiment. Often referred to as Public/Private Key Cryptography, these cryptosystems can provide a number of different functions depending on how they are used, according to an exemplary embodiment.

The most common usage of asymmetric cryptography is to send messages with a guarantee of confidentiality, according to an exemplary embodiment. If User A wanted to send a message to User B, User A would get access to User B's publicly available Public Key, according to an exemplary embodiment. The message is then encrypted with this key and sent to User B, according to an exemplary embodiment. Because of the cryptosystem's property that messages encoded with the Public Key of User B can only be decrypted with User B's Private Key, only User B can read the message, according to an exemplary embodiment.

Another usage scenario is one where User A wants to send User B a message and wants User B to have a guarantee that the message was sent by User A, according to an exemplary embodiment. In order to accomplish this, User A can encrypt the message with their Private Key, according to an exemplary embodiment. The message can then only be decrypted using User A's Public Key, according to an exemplary embodiment. This can guarantee that User A created the message because User A is then the only entity who had access to the Private Key required to create a message that can be decrypted by User A's Public Key, according to an exemplary embodiment. This is essentially a digital signature guaranteeing that the message was created by User A, according to an exemplary embodiment.

A Certificate Authority (CA), whose public certificates are installed with browsers or otherwise commonly available, may also digitally sign public keys or certificates, according to an exemplary embodiment. One can authenticate remote systems or users via a mutual trust of an issuing CA, according to an exemplary embodiment. One can trust their 'root' certificates, according to an exemplary embodiment, which in turn authenticates the public certificate presented by the server.

PGP and SSL are prime examples of systems implementing asymmetric cryptography, using RSA and/or other algorithms, according to an exemplary embodiment.

Hashes

Hash functions, according to an exemplary embodiment, take some data of an arbitrary length (and possibly a key or password) and generate a fixed-length hash based on this input. Hash functions used in cryptography have the property that it can be easy to calculate the hash, but difficult or impossible to re-generate the original input if only the hash value is known, according to an exemplary embodiment. In addition, hash functions useful for cryptography have the property that it is difficult to craft an initial input such that the hash will match a specific desired value, according to an exemplary embodiment.

MD5 and SHA-1 are common hashing algorithms, according to an exemplary embodiment. These algorithms are considered weak and are likely to be replaced in due time after a process similar to the AES selection, according to an exemplary embodiment. New applications should consider using SHA-256 instead of these weaker algorithms, according to an exemplary embodiment.

Key Exchange Algorithms

There are also key exchange algorithms (such as Diffie-Hellman for SSL), according to an exemplary embodiment. These key exchange algorithms can allow use to safely exchange encryption keys with an unknown party, according to an exemplary embodiment.

Algorithm Selection

As modern cryptography relies on being computationally expensive to break, according to an exemplary embodiment, specific standards can be set for key sizes that can provide assurance that with today's technology and understanding, it will take too long to decrypt a message by attempting all possible keys, according to an exemplary embodiment.

Therefore, we need to ensure that both the algorithm and the key size are taken into account when selecting an algorithm, according to an exemplary embodiment.

FIG. 10 depicts an example application server and web server network architecture including an example fully meshed, redundant communications network load balancing application server architecture as may be used for an example smarthub system service provider and/or a digital financial services and/or payment service provider, and may couple client devices such as, e.g., but not limited to, service provider, buyer devices, supplier devices, public blockchain, proxy NFT systems, data repository systems, authentication systems, ledger tracking systems, blockchain distributed ledge systems, NFT systems, SmartPass NFT authentication systems, notification systems, request response systems, financing request systems, collateralized NFT request response systems, etc. to example service devices using an example network infrastructure, according to an example embodiment of the present invention. FIG. 10 depicts an exemplary schematic block diagram 1000 illustrating an exemplary communications network device hardware architecture 1000 showing exemplary network devices including exemplary application server devices 1002, exemplary storage devices 1006, web server devices 1008, all coupled to an exemplary communications network 1004, which may be coupled to other devices such as, e.g., but not limited to, a cyber security network security operations environment device or devices 1004, and other end user and other internal and/or external user computing and/or communications devices 1010, which may be coupled to the network communications environment 1004 by one or more physical devices not shown, such as, e.g., but not limited to, network interface cards (NICs), wireless local area network WLAN or wireless fidelity (WI-FI) (IEEE 802.11 communication technologies), physical wires, twisted pair, coaxial cable, fiber optic cable, and/or other communications network cabling, wireless communication access points and/or wireless antennae, wires, wireless media, routers, gateways, access points, exchange carrier facilities, modulator/demodulator (modems), modulating equipment, cellular network exchange devices, etc. Block diagram 1000 may serve as an exemplary logical diagram of associated physical devices. Physical devices may communicate via one or more communications network software protocols via exemplary protocol languages or stacks which may correlate to the Open Systems Interconnect (OSI) stack of communication layers, such as, e.g., but not limited to, Internet Protocol (IP), transmission control protocol (TCP), among various other protocols including, e.g., but not limited to, TCP/IP protocols, UDP, hypertext transfer protocol (HTTP), file transfer protocol (FTP), security protocols (e.g., HTTPS, SFTP, FTPS, TLS, etc.), as will be apparent to those skilled in the relevant art. Various load sharing devices and port sharing devices may be used, as well as protocol tracing and packet tracing devices, which may be able to access such communications data and perform exemplary processing including packet inspection, deep packet inspection, network tracing, packet inspection (e.g., source and destination address, etc.) and the like. Such systems may be used to perform various block chain related distributed ledger technologies so as to replicate data which may be encrypted and decrypted using various algorithms. Certain algorithms may be used which may be resilient to conventional decryption techniques, resilient to brute force attack decryption techniques, and/or may be resilient to quantum computing based decryption techniques. Such software and hardware network analysis and/or processing tools may be used to process communications network traffic internal to, and/or external from an exemplary entity organization and an exemplary network operations center (NOC) network monitoring organization may be able to analyze such network traffic to, e.g., process different types of traffic, using various sophisticated network operations tools and techniques as well as to perform various automated processing as described further herein.

Although example embodiments of the invention are illustrated and described herein as embodied in an example embodiment, the invention should not be limited to the details shown in those example embodiments because various modifications and structural changes may be made without departing from the spirit of the invention while remaining within the scope and range of equivalents of the claims.

The construction and method of operation of various example embodiments of the claimed invention and additional features and/or advantages of various example embodiments of the invention are best understood from the following description of specific example embodiments when read in connection with the accompanying drawings.

Various exemplary embodiments of the invention are discussed in detail herein. While specific exemplary embodiments are discussed herein, it should be understood that this is done for illustration purposes only. A person skilled in the relevant art will recognize that other components and configurations can be used without parting from the spirit and scope of the invention.

What is claimed is:

1. A computer implemented method of using an electronically implemented, automatically executed computerized finite state machine (FSM) for electronically processing electronic data indicative of at least one electronic event data or electronic data indicative of at least one event for at least one shipment of at least one cargo at at least one port as the at least one shipment moves through at least one electronic regulatory customs process step, in an electronic distributed, application (app) computing environment system device comprising:

at least one electronic computer processor device coupled to at least one electronic memory storage device and coupled to at least one electronic communications network interface, configured to electronically enable the at least one electronic computer processor device to electronically communicate, via the at least one electronic communications network interface to at least one external electronic data communications network, the method comprising:

electronically processing, by the at least one electronic computer processor, an electronic collection of at least one electronic distributed computer app node service of the electronically implemented, automatically executed electronic computerized FSM wherein each of said at least one electronic distributed computer app node service comprises a single state of the electronically implemented, automatically executed electronic computerized FSM, wherein each of said at least one electronic distributed computer app node service comprises at least one or more of electronic implementation or electronic deployment as an independent operating electronic distributed computer service comprising electronic data indicative of at least one electronic business rule for said each of said at least one electronic distributed computer app node service;

electronically executing, by the at least one electronic computer processor device, said electronic data indicative of said at least one electronic business rule, by at least one electronic rules engine device;

electronically obtaining, by the at least one electronic computer processor device, the electronic data indicative of the at least one electronic event data of the at least one shipment (in at least one electronic nonfungible token (NFT)) from at least one electronic shipment record database device;

electronically combining, by the at least one electronic computer processor device, at least one incoming of the at least one electronic data indicative of the at least one electronic event data with the at least one electronic data indicative of any at least one electronic existing shipment data (in the at least one electronic NFT);

electronically processing, by the at least one electronic computer processor device, said electronic data indicative of said at least one electronic business rule, by the at least one electronic rules engine device;

electronically receiving, by the at least one electronic computer processor device, the electronic data indicative of at least one transaction event, and electronically determining, by the at least one electronic computer processor device, upon receipt of the electronic data indicative of said at least one transaction event, at least one electronic NFT state of the at least one electronic NFT and electronically routing, by the at least one electronic computer processor device, the electronic data indicative of said at least one transaction event to at least one appropriate of said at least one electronic distributed computer app node service, wherein said at least one appropriate of said at least one electronic distributed computer app node service comprises: electronically processing, by the at least one electronic computer processor device, said at least one electronic NFT state;

electronically processing, by the at least one electronic computer processor device, at said at least one appropriate of said at least one electronic distributed computer app node services, electronically combining the electronic data indicative of the electronic event data with the at least one electronic data indicative of the any at least one electronic existing shipment data (in the at least one electronic NFT) and at least one electronic data indicative of at least one electronic associated rule set of said electronic data indicative of said at least one electronic business rules, and electronically processing, by the at least one electronic computer processor device, by said at least one electronic rules engine device said at least one electronic data indicative of said at least one electronic associated rule set on the at least one electronic data indicative of the any at least one electronic existing shipment data (in the at least one electronic NFT), comprising:

electronically evaluating, by the at least one electronic computer processor device, of said at least one electronic business rule or said at least one electronic data indicative of said at least one electronic associated rule set using at least one artificial intelligence (AI) or machine learning (ML) electronic model comprising:

electronically evaluating at least one condition of at least one or more of:

the electronic data indicative of the at least one electronic event data, or the any at least one electronic existing shipment data (in the at least one electronic NFT); and electronically providing, by the at least one electronic computer processor device, via at least one graphical user interface (GUI), interactive access comprising at least one or more of:

electronically reporting of, electronically reviewing of, electronically auditing of, or electronically displaying of, at least one or more of:

said electronically evaluating, the electronic data indicative of the at least one electronic event data, said at least one electronic data indicative of said at least one electronic associated rule set, or the electronic data indicative of said at least one transaction event;

electronically combining, by the at least one electronic computer processor device, at least one electronic data indicative of at least one value and at least one electronic data indicative of at least one action identifier into at least one electronic data indicative of at least one electronic transaction action request, after electronic completion of said electronically processing of the at least one data indicative of at least one electronic associated rule set of said at least one appropriate of said at least one electronic distributed computer app node service, by said at least one electronic rules engine device;

electronically routing, by the at least one electronic computer processor device, said at least one electronic data indicative of said at least one electronic transaction action request to at least one matched electronic action service device of said at least one electronic distributed computer app node services, and upon electronically authenticating said at least one electronic data indicative of said at least one electronic transaction action request, electronically executing, by the at least one electronic computer processor device, said at least one electronic data indicative of said at least one electronic transaction action request, based on at least one electronic data detail included in said at least one electronic data indicative of said at least one electronic transaction action request;

electronically executing, by the at least one electronic computer processor device, an after state electronic processor, after said electronically routing has been routed, and electronically determining, by the at least one electronic computer processor device, at least one electronic state transition comprising performing as required at least one or more of:

electronically performing, by the at least one electronic computer processor device, at least one electronic update save to the at least one electronic data indicative of the any at least one electronic existing shipment data (in the at least one electronic NFT);

electronically logging, by the at least one electronic computer processor device, at least one electronic data indicative of at least one electronic activity transaction to at least one electronic blockchain device;

electronically posting, by the at least one electronic computer processor device, at least one electronic data indicative of at least one electronic activity transaction to the at least one electronic blockchain device;

electronically transmitting, by the at least one electronic computer processor device, at least one electronic notification message;

electronically determining, by the at least one electronic computer processor device, the at least one electronic data indicative of at least one electronic fulfillment criteria for at least one electronic current state; or electronically receiving, by the at least one electronic computer processor device, at least one electronic instruction that may override at least one electronic data indicative of at least one electronic processing instructions for the at least one electronic current state; and electronically placing stateless, by the at least one electronic computer processor device, said at least one matched electronic action service device of said at least one electronic distributed computer app node services, after said electronically executing of said at least one electronic data indicative of said at least one electronic transaction action request is complete, and electronically clearing out, by the at least one electronic computer processor device, any electronic data electronically processed for the at least one electronic data indicative of any at least one electronic existing shipment data (in the at least one electronic NFT) and the at least one electronic data indicative of the at least one electronic transaction event received, wherein said electronically placing stateless comprises:

an electronic stateless-service electronically replicated in a number of electronically replicated nodes based on a volume of electronic transactions, thereby electronically enabling auto-scaling with the number of electronically replicated nodes to electronically handle processing for the volume of the electronic transactions, wherein an electronically determined increase in number of electronically replicated nodes electronically accommodates an increase in the volume of electronic transactions and an electronically determined decrease in number of electronically replicated nodes electronically accommodates a decrease in the volume of electronic transactions, and wherein electronic scaling does not impact electronic processing for an electronic life cycle of the electronic system.

2. The method according to claim 1, wherein said electronically placing stateless comprises at least one or more of:

wherein electronic stateless service is separate from the at least one electronic NFT state, or the at least one electronic application record state which is part of the electronically implemented, automatically executed electronic computerized FSM device; and wherein a lifecycle of a system modeled as the electronically implemented, automatically executed electronic computerized FSM device comprises at least one electronic stateless-service electronic distributed computer app node service electronically operating for each electronic individual record state and electronic executable code.

3. A system of using an electronic finite state machine (FSM) electronic circuitry configured to electronically process electronic data indicative of at least one electronic data or at least one electronic event data of at least one shipment of at least one cargo at at least one port as the at least one shipment moves through customs, in an electronic distributed, application (app) computing environment system device, the system comprising:

at least one electronic computer processor, coupled to at least one electronic memory storage device and coupled via at least one electronic communications network interface, configured to be coupled to at least one electronic data communications network, the system comprising wherein said at least one electronic computer processor is electronically configured to:

electronically process an electronic collection of at least one electronic distributed computer app node service of the electronic FSM electronic circuitry wherein each of said at least one electronic distributed computer app node service comprises an electronic single state of the electronic FSM electronic circuitry wherein each of said at least one electronic distributed computer app node services comprises at least one or more of implementation or deployment as an independent operating electronic distributed computer service comprising electronic data indicative of at least one electronic business rule for said each of said at least one electronic distributed computer app node services;

electronically execute said electronic data indicative of said at least one electronic business rule, by at least one electronic rules engine device;

electronically obtain the electronic data indicative of the at least one electronic data of the at least one shipment (in at least one electronic nonfungible token (NFT)) from at least one electronic shipment record database device;

electronically combine at least one incoming of the at least one electronic data indicative of the at least one electronic event data with the at least one electronic data indicative of any at least one electronic existing shipment data (in the at least one electronic NFT);

electronically process said electronic data indicative of said at least one electronic business rule, by the at least one electronic rules engine device;

electronically receive the electronic data indicative of at least one electronic transaction event, and electronically determine upon electronic receipt of the electronic data indicative of said at least one electronic transaction event, at least one electronic NFT state of the at least one electronic NFT and electronically route the electronic data indicative of said at least one electronic transaction event to at least one appropriate of said at least one electronic app node services for electronic processing said at least one electronic NFT state;

electronically process at said appropriate of said at least one electronic distributed computer app node services, electronically combine the electronic data indicative of electronic event data with the at least one electronic data indicative of the any at least one electronic existing shipment data (in the at least one electronic NFT) and at least one electronic data indicative of at least one electronic associated rule set of said electronic data indicative of said at least one electronic business rules, and electronically process by said at least one electronic rules engine device said at least one electronic data indicative of said at least one electronic associated rule set on the at least one electronic data indicative of any at least one electronic existing shipment data (in the at least one electronic NFT) comprising being configured to:

electronically evaluate said at least one electronic business rule or said at least one electronic data indicative of said at least one electronic associated rule set using at least one artificial intelligence (AI) or machine learning (ML) electronic model comprising being configured to:

electronically evaluate at least one condition of at least one or more of:

the electronic data indicative of the at least one electronic event data, or the any at least one electronic existing shipment data (in the at least one electronic NFT); and electronically provide via at least one graphical user interface (GUI), interactive access comprising being configured to at least one or more of:

electronically report, electronically review, electronically audit, or electronically display, at least one or more of:

said electronically evaluate, the electronic data indicative of the at least one electronic event data, said at least one electronic data indicative of said at least one electronic associated rule set, or the electronic data indicative of said at least one transaction event;

electronically combine at least one electronic data indicative of at least one electronically determined value and at least one electronic data indicative of at least one action identifier into at least one electronic data indicative of at least one electronic transaction action request, after electronic completion of said electronically processing of the at least one data indicative of at least one electronic associated rule set of said at least one appropriate of said at least one electronic distributed computer app node service, by said at least one electronic rules engine device;

electronically route said at least one electronic data indicative of said at least one electronic transaction action request to at least one matched action service device of said at least one electronic distributed computer app node services, and upon electronically authenticating said at least one electronic data indicative of said at least one electronic transaction action request, electronically execute said at least one electronic data indicative of said at least one electronic transaction action request, based on at least one electronic data detail included in said at least one electronic data indicative of said at least one electronic transaction action request;

electronically execute an electronic after state electronic machine, after said electronically route has been electronic routed, and electronically determine at least one electronic state transition comprising being electronically configured to electronically perform as required at least one or more of:

electronically perform at least one electronic update saves to the at least one electronic data indicative of the any at least one electronic existing shipment data (in the at least one electronic NFT);

electronically log at least one electronic data indicative of at least one electronic activity transaction to at least one electronic blockchain device;

electronically post at least one electronic data indicative of at least one electronic activity transaction to the at least one electronic blockchain device;

electronically transmit at least one electronic notification message;

electronically determine at least one electronic data indicative of at least one electronic fulfillment criteria for at least one electronic current state; or electronically receive or electronically not receive at least one electronic instruction for electronically processing in the at least one electronic current state; and electronically place stateless said matched electronic action service device of said at least one electronic distributed computer app node services, after said electronically execute of said at least one electronic data indicative of said at least one electronic transaction action request is electronically complete, and electronically clear out any electronic data electronically processed for the at least one electronic data indicative of any at least one electronic existing shipment data (in the at least one electronic NFT) and the at least one electronic data indicative of the at least one electronic transaction event electronically received, wherein the system configured to electronically place stateless comprises:

an electronic stateless-service electronically replicated in a number of electronic replicated nodes based on a volume of electronic transactions, thereby electronically enabling electronic auto-scaling with the number of electronic replicated nodes to electronically handle electronic processing for the volume of the electronic transactions, wherein an electronically determined increase in electronic number of electronically replicated nodes electronically accommodates an increase in the volume of electronic transactions and an electronically determined decrease in number of electronic replicated nodes electronically accommodates a decrease in the volume of electronic transactions, and wherein electronic scaling does not impact electronic processing for an electronic life cycle of the electronic system.

4. The method according to claim 1, wherein the at least one electronic regulatory customs process step comprises at least one or more of:

A Start electronic state,
an In_Transit electronic state,
a Ready for Customs electronic state,
an At Customs electronic state,
a Released electronic state,
a Rejected electronic state,
an On Hold electronic state, or
a Completed electronic state.

5. The method according to claim 4, wherein the At Customs state comprises receiving at least one electronic data indicative of at least one electronic trigger comprising electronically receiving at least one or more of:

at least one electronically approved trigger by at least one or more of:

at least one electronic system user interface electronically receiving at least one electronic selection to electronically approve the electronic NFT state to proceed to Customs Processing; or electronically receiving an electronic automatic evaluation of the electronic NFT state electronically performed and electronically receiving approval selection of the electronic NFT state;

electronically Print, electronically Review, electronically Confirm electronic trigger by at least one or more of:

electronic system user interface electronically receiving electronic selection to electronic print; or electronic system user interface electronically receiving electronic selection to review the electronic NFT documents and electronic data contents; or electronic system user interface electronically receiving electronic selection to at least one of electronically verify or electronically confirm electronic review of electronic contents electronic completed;

electronically Not Yet electronic trigger by at least one or more of:

electronic system user interface electronically receiving electronic selection to electronically withhold the electronic NFT state electronically indicating not completed for at least one or more of an incorrect electronic document was electronically received or a electronic document is incorrectly electronic assigned and needs to be electronic corrected, and electronic transitions electronic NFT state to the In_Transit electronic State; or electronically Other Events electronic trigger by at least one or more of:

an electronic GPS coordinate update event;

an electronic report on electronic port status event;

another electronic document electronically arrived not required for electronic Customs Processing event; or wherein the other electronic events trigger is electronically processed and the electronic Record State remains in the Ready For Customs electronic state.

6. The method according to claim 1, wherein said at least one port comprises: at least one shipping port.

7. The method according to claim 1, wherein said electronically providing said interactive access, via said at least one GUI comprises at least one or more of:

electronically providing, by the at least one electronic computer processor, at least one electronic mobile device user interface (Mobile UI); or electronically providing, by the at least one electronic computer processor, at least one electronic web-based user interface (Web UI).

8. The method according to claim 1, wherein said electronically evaluating using said at least one artificial intelligence (AI) or machine learning (ML) electronic model comprises at least one or more of:

electronically evaluating, by the at least one electronic computer processor, by at least one neural network;

electronically evaluating, by the at least one electronic computer processor, by at least one supervised learning method;

electronically evaluating, by the at least one electronic computer processor, by at least one unsupervised learning method;

electronically evaluating, by the at least one electronic computer processor, by at least one reinforcement learning method;

electronically evaluating, by the at least one electronic computer processor, by at least one reinforcement learning method;

electronically evaluating, by the at least one electronic computer processor, by at least one dynamic programming method;

electronically evaluating, by the at least one electronic computer processor, by at least one natural language analysis method;

electronically evaluating, by the at least one electronic computer processor, by at least one semantic analysis method; or electronically evaluating, by the at least one electronic computer processor, by at least one large language model (LLM) interactive request and response method.

9. The method according to claim 1, wherein different electronic record-state types of said electronic stateless-service electronic distributed computer app node services are electronically scaled independently of each other.

10. The system according to claim 3, wherein the system configured to electronically place stateless comprises at least one or more of:

wherein electronic stateless service is separate from the at least one electronic NFT state, or the at least one electronic application record state which is part of the electronically implemented, automatically executed electronic computerized FSM device; and wherein an electronic lifecycle of a system modeled as the electronically implemented, automatically executed electronic computerized FSM device comprises at least one stateless-service electronic distributed computer app node service operating for each electronic individual record state and electronically executable code.

11. The system according to claim 3, wherein the system is configured wherein the at least one electronic regulatory customs process step comprises at least one or more of:

A Start electronic state,
an In_Transit electronic state,
a Ready for Customs electronic state,
an At Customs electronic state,
a Released electronic state,
a Rejected electronic state,
an On Hold electronic state, or
a Completed electronic state.

12. The system according to claim 11, wherein the electronic At Customs state comprises electronically receiving at least one electronic trigger comprising at least one or more of:

electronically approved electronic trigger by at least one or more of:

an electronic system user interface electronically receives electronic selection to electronic approve the electronic NFT state to electronically proceed to electronic Customs Processing; or an electronic automatic evaluation of the electronic NFT state is electronically performed and electronically receives electronic approval electronic selection of the electronic NFT state;

electronic Print, electronic Review, electronic Confirm electronic trigger by at least one or more of:

electronic system user interface electronically receives electronic selection to electronically print; or electronic system user interface electronically receives electronic selection to electronically review the electronic NFT documents and electronic data contents; or electronic system user interface electronically receives electronic selection to at least one of electronically verify or electronically confirm electronic review of electronic contents electronically completed;

electronic Not Yet trigger by at least one or more of:

electronic system user interface electronically receives electronic selection to electronically withhold the electronic NFT state electronically indicating not completed for at least one or more of an incorrect electronic document was electronically received or a electronic document is incorrectly electronic assigned and needs to be electronic corrected, and electronically transitions electronic NFT state to the In_Transit State; or electronic Other Events trigger by at least one or more of:

an electronic GPS coordinate update electronic event;

an electronic report on electronic port status event;

another electronic document electronically arrived not required for electronic Customs Processing event; or wherein the other events electronic trigger is electronically processed and the electronic Record State remains in the electronic Ready For Customs state.

13. The system according to claim 3, wherein said at least one port comprises: at least one shipping port.

14. The system according to claim 3, wherein said electronically provide said interactive access, via said at least one GUI comprises being configured to at least one or more of:

electronically provide at least one electronic mobile device user interface (Mobile UI); or electronically provide at least one electronic web-based user interface (Web UI).

15. The system according to claim 3, wherein different electronic record-state types of said electronic stateless-service electronic distributed computer app node services are electronically scaled independently of each other.

16. A computer program product embodied on a computer accessible nontransitory storage medium, including at least one instruction, which when electronically executed on at least one electronic computer processor device performs an electronic computer-implemented method of using an electronically implemented, automatically executed electronic computerized finite state machine (FSM) for electronically processing electronic data indicative of at least one data or at least one electronic events for at least one shipments of at least one cargo at at least one port as the at least one shipment moves through at least one electronic regulatory customs process step, in an electronic distributed, application (app) computing environment system device comprising the at least one electronic computer processor device coupled to at least one electronic memory storage device and coupled to at least one electronic communications network interface, configured to electronically enable the at least one electronic computer processor device to electronically communicate, via the at least one electronic communications network interface to at least one external electronic data communications network, the method comprising:

electronically processing an electronic collection of at least one electronic distributed computer app node service of the electronically implemented, automatically executed computerized FSM wherein each of said at least one electronic distributed computer app node service comprises a single state of the electronically implemented, automatically executed electronic computerized FSM, wherein each of said at least one electronic distributed computer app node services comprises at least one or more of implementation or deployment as an independent operating electronic distributed computer service comprising electronic data indicative of at least one electronic business rule for said each of said at least one electronic distributed computer app node services;

electronically executing said electronic data indicative of said at least one electronic business rule, by at least one electronic rules engine device;

electronically obtaining the electronic data indicative of the at least one electronic data of the at least one shipment (in at least one electronic nonfungible token (NFT)) from at least one electronic shipment record database device;

electronically combining at least one incoming of the at least one electronic data indicative of the at least one electronic event data with the at least one electronic data indicative of any at least one electronic existing shipment data (in the at least one electronic NFT);

electronically processing said electronic data indicative of said at least one electronic business rule, by the at least one electronic rules engine device;

electronically receiving the electronic data indicative of at least one electronic transaction event, and electronically determining upon receipt of the electronic data indicative of said at least one electronic transaction event, at least one electronic NFT state of the at least one electronic NFT and electronically routing the electronic data indicative of said at least one electronic transaction event to at least one appropriate of said at least one electronic distributed computer app node service, wherein said at least one appropriate of said at least one electronic distributed computer app node services comprises:

electronically processing said at least one electronic NFT state;

electronically processing at said at least one appropriate of said at least one electronic distributed computer app node services, electronically combining the electronic data indicative of electronic event data with the at least one electronic data indicative of the any at least one electronic existing shipment data (in the at least one electronic NFT) and at least one electronic data indicative of at least one electronic associated rule set of said electronic data indicative of said at least one electronic business rules, and electronically processing by said at least one electronic rules engine device said at least one electronic data indicative of said at least one electronic associated rule set on the at least one electronic data indicative of the any at least one electronic existing shipment data (in the at least one electronic NFT), comprising:

electronically evaluating of said at least one electronic business rule or said at least one electronic data indicative of said at least one electronic associated rule set using at least one artificial intelligence (AI) or machine learning (ML) electronic model comprising:

electronically evaluating at least one condition of at least one or more of:

the electronic data indicative of the at least one electronic event data, or the any at least one electronic existing shipment data (in the at least one electronic NFT); and electronically providing via at least one graphical user interface (GUI), interactive access comprising at least one or more of:

electronically reporting of, electronically reviewing of, electronically auditing of, or electronically displaying of, at least one or more of:

said electronically evaluating, the electronic data indicative of the at least one electronic event data, said at least one electronic data indicative of said at least one electronic associated rule set, or the electronic data indicative of said at least one transaction event;

electronically combining at least one electronic data indicative of at least one electronic value and at least one electronic data indicative of at least one action identifier into at least one electronic data indicative of at least one electronic transaction action request, after electronic completion of said electronically processing of the at least one electronic data indicative of at least one electronic associated rule set of said at least one appropriate of said at least one electronic distributed computer app node service, by said at least one electronic rules engine device;

electronically routing at least one electronic data indicative of said at least one electronic transaction action request to at least one matched electronic action service device of said at least one electronic distributed computer app node services, and upon electronically authenticating said at least one electronic data indicative of said at least one electronic transaction action request, electronically executing said at least one electronic data indicative of said at least one electronic transaction action request, based on at least one electronic data detail included in said at least one electronic data indicative of said at least one electronic transaction action request;

electronically executing an after state electronic processor, after said electronically routing has been electronically routed, and electronically determining at least one electronic state transition comprising performing as required at least one or more of:

electronically performing at least one electronic update saves to the at least one electronic data indicative of the any at least one electronic existing shipment data (in the at least one electronic NFT);

electronically logging at least one electronic data indicative of at least one electronic activity transaction to at least one electronic blockchain device;

electronically posting at least one electronic data indicative of at least one electronic activity transaction to the at least one electronic blockchain device;

electronically transmitting at least one electronic notification message;

electronically determining at least one electronic data indicative of at least one electronic fulfillment criteria for at least one electronic current state; or electronically receiving or not receiving at least one electronic instruction that may electronically override at least one electronic data indicative of at least one electronic processing instruction for the at least one electronic current state; and electronically placing stateless said at least one matched electronic action service device of said at least one electronic distributed computer app node services, after said electronically executing of said at least one electronic data indicative of said at least one electronic transaction action request is electronically complete, and electronically clearing out any electronic data processed for the at least one electronic data indicative of any at least one electronic existing shipment data (in the at least one electronic NFT) and the at least one electronic data indicative of the at least one electronic transaction event electronically received, wherein said method of said electronically placing stateless comprises:

an electronic stateless-service electronically replicated in number of electronically replicated electronic nodes based on a volume of electronic transactions, thereby electronically enabling electronic auto-scaling with the number of electronic replicated electronic nodes to electronically handle electronic processing for the volume of the electronic transactions;

wherein an increase in number of electronically replicated electronic nodes electronically accommodates an increase in the volume of electronic transactions and a decrease in number of electronically replicated electronic nodes electronically accommodates a decrease in the volume of electronic transactions; and wherein electronic scaling does not impact electronic processing for an electronic life cycle of the electronic system.

17. The computer program product according to claim 16, wherein said method of said electronically placing stateless comprises at least one or more of:

wherein stateless service is separate from the at least one NFT state, or the at least one application record state which is part of the electronically implemented, automatically executed computerized FSM device;

wherein a lifecycle of a system modeled as the electronically implemented, automatically executed computerized FSM device comprises at least one stateless-service electronic distributed computer app node service electronically operating for each electronic individual record state and electronically executable code.

18. The computer program product according to claim 16, wherein said method wherein the at least one electronic regulatory customs process step comprises at least one or more of:

A Start electronic state,
an In_Transit electronic state,
a Ready for Customs electronic state,
an At Customs electronic state,
a Released electronic state,
a Rejected electronic state,
an On Hold electronic state, or
a Completed electronic state.

19. The computer program product according to claim 18, wherein the At Customs electronic state comprises receiving at least one trigger comprising electronically receiving at least one or more of:

electronically approved electronic trigger by at least one or more of:

electronic system user interface electronically receiving electronic selection to electronically approve the electronic NFT state to electronically proceed to electronic Customs Processing; or electronically receiving an electronic automatic evaluation of the electronic NFT state, electronically performed and electronically receiving electronic approval electronic selection of the electronic NFT state;

electronic Print, electronic Review, electronic Confirm electronic trigger by at least one or more of:

electronic system user interface electronically receiving electronic selection to electronically print; or electronic system user interface electronically receiving electronic selection to electronic review the electronic NFT documents and electronic data contents; or electronic system user interface receiving selection to at least one of verify or confirm review of contents completed;

Not Yet trigger by at least one or more of:

electronic system user interface electronically receiving electronic selection to electronically withhold the electronic NFT state electronic indicating not electronically completed for at least one or more of an incorrect electronic document was electronic received or an electronic document is incorrectly electronic assigned and electronically needs to be electronically corrected, and electronically transitions electronic NFT state to the In_Transit electronic State; or electronic Other Events trigger by at least one or more of:

an electronic GPS coordinate update electronic event;

a electronic report on electronic port status electronic event;

another electronic document electronically arrived not electronically required for electronic Customs Processing electronic event; or wherein the other events electronic trigger is electronically processed and the electronic Record State electronically remains in the Ready For Customs electronic state.

20. The computer program product according to claim 16, wherein said at least one port comprises:

at least one shipping port.

21. The computer program product according to claim 16, wherein said electronically providing said interactive access, via said at least one GUI comprises at least one or more of:

electronically providing at least one electronic mobile device user interface (Mobile UI); or electronically providing at least one electronic web-based user interface (Web UI).

22. The computer program product according to claim 16, wherein said electronically evaluating using said at least one artificial intelligence (AI) or machine learning (ML) electronic model comprises at least one or more of:

electronically evaluating by at least one neural network;

electronically evaluating by at least one supervised learning method;

electronically evaluating by at least one unsupervised learning method;

electronically evaluating by at least one reinforcement learning method;

electronically evaluating by at least one reinforcement learning method;

electronically evaluating by at least one dynamic programming method;

electronically evaluating by at least one natural language analysis method;

electronically evaluating by at least one semantic analysis method; or electronically evaluating by at least one large language model (LLM) interactive request and response method.

23. The computer program product according to claim 16, wherein different electronic record-state types of said electronic stateless-service electronic distributed computer app node services are electronically scaled independently of each other.

* * * * *